United States Patent
Renaud

(10) Patent No.: US 9,823,370 B2
(45) Date of Patent: Nov. 21, 2017

(54) METHOD FOR MANAGING A MASTER VESSEL CHANGE IN A MULTI-VESSEL SEISMIC SYSTEM

(71) Applicant: Sercel, Carquefou (FR)

(72) Inventor: Didier Renaud, Nantes (FR)

(73) Assignee: Sercel, Carquefou (FR)

( * ) Notice: Subject to any disclaimer, the term of this patent is extended or adjusted under 35 U.S.C. 154(b) by 266 days.

(21) Appl. No.: 14/696,097

(22) Filed: Apr. 24, 2015

(65) Prior Publication Data

US 2015/0309198 A1 Oct. 29, 2015

(30) Foreign Application Priority Data

Apr. 24, 2014 (EP) .................................... 14305608

(51) Int. Cl.
    *G01V 1/38* (2006.01)
    *G01V 1/13* (2006.01)
    *G01V 1/22* (2006.01)

(52) U.S. Cl.
    CPC .............. *G01V 1/3808* (2013.01); *G01V 1/13* (2013.01); *G01V 1/223* (2013.01); *G01V 1/3835* (2013.01); *G01V 1/3861* (2013.01); *G01V 2200/14* (2013.01); *G01V 2210/127* (2013.01); *G01V 2210/1293* (2013.01)

(58) Field of Classification Search
    CPC .................................................... G01V 1/3808
    USPC ......................................................... 367/15
    See application file for complete search history.

(56) References Cited

U.S. PATENT DOCUMENTS

| 3,906,352 A * | 9/1975 | Parker .................. G01V 1/3808 367/19 |
| 2007/0159921 A1 | 7/2007 | Regone et al. |
| 2012/0008459 A1 | 1/2012 | Coste et al. |
| 2012/0221182 A1 | 8/2012 | Holo et al. |
| 2012/0277941 A1* | 11/2012 | Noffsinger .............. B63B 49/00 701/21 |
| 2014/0146638 A1 | 5/2014 | Renaud |
| 2016/0202354 A1* | 7/2016 | Leonard .................... G01S 7/41 342/59 |

FOREIGN PATENT DOCUMENTS

EP 12306473.5 11/2012

OTHER PUBLICATIONS

Stijn Verstichel et al: "Ontology-driven middleware for next-generation train backbones", Science of Computer Programming, Dec. 19, 2006, pp. 4-24, XP05514599.

(Continued)

*Primary Examiner* — Ian J Lobo
(74) *Attorney, Agent, or Firm* — Ipsilon USA

(57) ABSTRACT

A method is provided for managing a master vessel change in a multi-vessel seismic system. The system includes a master vessel M and at least one slave vessel. The method includes, during at least a part of a multi-vessel operation: selecting a new master vessel M' among the at least one slave vessel, triggered by at least one predetermined event; and transmitting, to the at least one slave vessel, at least one piece of information related to a master vessel change from the master vessel M, called old master vessel, to the new master vessel M'.

17 Claims, 27 Drawing Sheets

(56) References Cited

OTHER PUBLICATIONS

European Search Report and Written Opinion dated Oct. 10, 2014 for corresponding European Patent Application No. EP14305608, filed Apr. 24, 2014.
Corresponding Mexican Office Action dated Mar. 27, 2017.
"Ontology-driven middleware for next-generation train backbones" Date of publication Dec. 19, 2006.

* cited by examiner

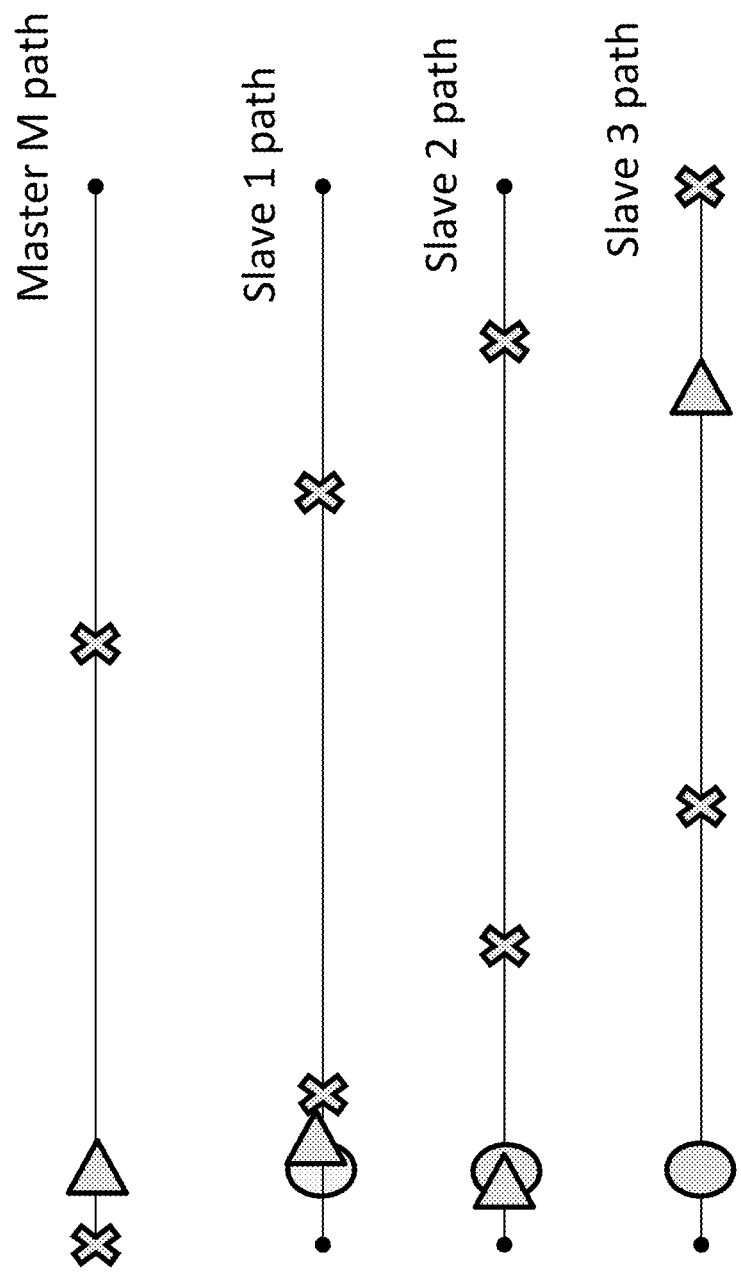

METHOD FOR MANAGING A MASTER VESSEL CHANGE IN A MULTI-VESSEL SEISMIC SYSTEM

1. FIELD OF THE DISCLOSURE

The field of the disclosure is that of geophysical data acquisition.

More precisely, the disclosure relates to marine seismic acquisition involving several vessels to achieve an imaging of the seabed earth crust.

In particular, the disclosure relates to a method for managing shots in a multi-vessel seismic system comprising several shooter vessels (a scheduler shooter vessel and at least one slave shooter vessel) and at least one listener vessel. Each shooter vessel comprises at least one seismic source performing shots at determined instants. Each listener vessel has a recording system and tows at least one streamer integrating seismic sensors.

In practice, a multi-vessel seismic system often comprises several shooter vessels and several listener vessels. Moreover, some vessels can be both a shooter vessel and a listener vessel.

The present disclosure can be applied notably to the oil exploration industry, but may also be applied to any field using a geophysical data acquisition network in a marine environment.

2. TECHNOLOGICAL BACKGROUND

2.1 Principle of a Seismic Marine Acquisition

To perform a seismic marine acquisition in a survey area, it is common to use seismic sources (guns, vibratory sources, . . . ) and seismic sensors. The sensors are housed in cables, called streamers (or acoustic linear antennas or seismic cables). Several streamers are used together to form an array of thousands of sensors. Sources are towed by one or several shooter vessels, and streamers are towed by one or several listener vessels. A same vessel can be both shooter vessel and listener vessel (i.e. can tow one or several streamers and one or several seismic sources).

To collect the geophysical data in the marine environment, the seismic sources (towed by at least one shooter vessel) are activated to generate single pulses or continuous sweep of energy. The signals generated by each source travels through the layers of the earth crust and the reflected signals are captured by the sensors (hydrophones) in the streamers (towed by at least one listener vessel).

Each theoretical location, where a seismic source must shoot, is a shot point location (also referred to as "shot point"), defined by its geographical coordinates (latitude/longitude and/or easting northing). When the source reaches this shot point, the gun is activated and produces an explosion. The set of shot points of all seismic sources is called "preplot".

The acquisition process is controlled and monitored by a navigation system (also referred to as INS, for "Integrated Navigation System"), which is onboard a master vessel and whose role is to compute position of sensors and sources, drive vessels along their acquisition path, according to the preplot geometry, and to activate sources to perform seismic acquisition at desired location (shot points).

The navigation system determines the moment of firing for each shot point, according to the positions of the various system components. This moment, also referred to as "shot time", is often noted T0.

The current positions of all equipments (hydrophones and guns) are known thanks to well-known measure means (GPS, RGPS, acoustics, compasses, depth sensors . . . ).

2.2 Multi-Vessel Operation

To further increase the quality of seismic imaging, the seismic surveys are now performed in multi-vessel operation, in order to obtain a wide azimuth illumination of the earth's crust (this explaining why, in this case, the preplot is referred to as "wide azimuth preplot" or "WAZ preplot"). A multi-vessel seismic system often comprises several shooter vessels and several listener vessels. A same vessel can be both shooter vessel and listener vessel.

The wide azimuth preplot defines a sequence of shot points, where the shots of the various vessels are interlaced.

The shooting order of the sources, and consequently of the vessels, is also defined in the wide azimuth preplot. The shooting order of the vessels must be respected and performed as close as possible to the geographic coordinates of the shot points specified in the wide azimuth preplot. So that the shooting order is complied, the various vessels must be synchronized.

2.3 Definitions

Bull's Eye (noted BE): a typical marine survey configuration comprises at least one slave vessel and one master vessel, which is the reference to compute proper position to other vessels. Thus, computing a target location by slave vessel is made from the master vessel's position. This target is called Bull's Eye (noted BE) and each slave vessel has to match as possible this target at the right time. In practice, a point of the master vessel (or of any equipment associated with the master vessel, e.g. a source) is used as reference point to calculate the ideal position of other vessels (slave vessels), i.e. for space synchronization of the slave vessels.

The ideal position of a slave vessel is indicated by a circular target ("Bull's Eye"), having:
  a center which depends on the projection of the master vessel's reference point on the sail line of the slave vessel. In the particular case where the slave shooter vessels are supposed to be aligned with the master vessel, the center of the "Bull's Eye" being coincident with the projection of the master vessel's reference point on the sail line of the slave vessel. In the particular case where the shooter vessels are not supposed to be aligned, there is a predetermined offset, along slaves vessels sail line, between the center of the "Bull's Eye" and the projection of the master vessel's reference point on the sail line of the slave vessel; and
  a radius of tolerance which can be determined by contract requirements (e.g. 10 m).

A reference point of the slave vessel, defined in advance, must be located in the "Bull's Eye" to ensure proper synchronization of the slave vessel.

The way how the master vessel reference point is projected, may differ depending of the projection algorithm, as illustrated by FIGS. 1a and 1b.

In all figures later described, a triangle represents a vessel, an oval represents a "Bull's Eye" and a cross represents a master vessel reference point or a shot point depending on the case. Moreover, dot symbols represent the master projections on slave production lines.

As a first example (FIG. 1a), the master vessel reference point is projected on the slave lines with static offset and an orthogonal projection, as can be seen in this FIG. 1a for the three "Bull's Eyes" corresponding to the slave vessels 1, 2 and 3.

As a second example (FIG. 1b), the master vessel reference point projection is computed from the advancement of the master vessel along its navigation path. The "Bull's Eye" of each slave vessel is advanced along its corresponding slave navigation path depending on the advance of the master on its own path. The input parameters are: master vessel path definition, slave vessel path definition and master path progression on path. As illustrated on this FIG. 1b, the advancement of the master vessel along its navigation path is 25%, thus the projected reference point for the slave vessel 1 is located at the point corresponding to an advancement of 25% of the slave path.

Basically, one can say that master vessel (or any points or elements owned by master vessel) is projected on slave path to compute its optimal position.

Time to Shot, also called shooting time:

The master vessel "Time to shot" (or "Shot Time T0") is usually computed from:
- master path and its shot points locations,
- a shot point distance between a shot point of the preplot and a master shot predict point (master shot predict point is usually the guns (sources) location, or any other point owned by the master vessel),
- master vessel speed along the path.

Usually, time to shot for slave vessels is computed from a master vessel shooting time to ensure good shot scheduling. In other way, slave vessels can compute their own time to shot based on a scheduling algorithm from:
- a linear interpolation from master's vessel predictions,
- or master prediction time to shot, shooting time windows computed from master's time prediction, and physical positions of slave vessel, if they are inside the shooting time window,
- or any constraints linked to master vessel predictions (for example a minimum of shot time interval between two shots).

2.4 Drawbacks of Current Solutions

A major drawback of the multi-vessel surveys based on a master vessel is that the survey has to be stopped if the master vessel is not able to perform its operation, for any reason like a turn for example. In this case, the system needs to be reconfigured in order to identify a new master vessel.

3. SUMMARY OF THE DISCLOSURE

A particular aspect of the present disclosure proposes a method for managing a master vessel change in a multi-vessel seismic survey involving a plurality of vessels and comprising a master vessel M and at least one slave vessel moving along their respective path, the master vessel being the reference to compute proper position of said at least one slave vessel, and at least one seismic source towed by at least one vessel, said method comprising, during at least a part of a multi-vessel survey:
- a step of selecting (21, 21') a new master vessel M' among the at least one slave vessel, triggered by at least one predetermined event;
- a step of transmitting (22, 22'), to said at least one slave vessel, at least one piece of information related to a master vessel change from the master vessel M, called old master vessel, to the new master vessel M'.

Thus, this particular embodiment relies on a wholly novel and inventive approach in which the master vessel is changing from an "old" master vessel to a "new" master vessel, during the production, in order to avoid dysfunctions whatever is happening to the old master vessel, i.e. even if the old master vessel is no more able to perform its operation during a survey (because of a turn for example).

For example, this particular embodiment allows not to stop the production and not to stop vessel shooting for all vessels, whatever is happening to the "old" master vessel, thus allowing to have regular shooting in time for all the vessels involved into the operation.

This also allows remaining compliant with environmental regulations, which requires having a regular shooting in time of all vessels. Indeed, this particular embodiment ensures that all vessels will perform all shots it has to shot with the good schedule in time, even during the change between old and new master vessels.

Moreover, this particular embodiment ensures a regular coverage, even if the old master vessel has to be stopped.

According to this particular embodiment, a predetermined event triggers a step of changing the master vessel, by selecting a new one among the vessels of the system. After the selection of the new master vessel, all the vessels of the system need to be aware of this change, for example by transmitting a piece of information related to such a change. This piece of information may be transmitted for example by a supervising tool located on the old master vessel or any other vessel and may comprise several levels of information.

For example, in a "distributed" mode, this piece of information corresponds to an indication of the master vessel change comprising data related to the new master vessel. For example, this piece of information corresponds to a transition between old and new master vessel, as a "crenel" for a non-progressive transition, and as a "ramp" for a progressive transition. With this piece of information, all slave vessels are able to compute the new "Bull's Eye" and shooting time prediction for the new master vessel.

According to another example, in a "centralized" mode, this piece of information corresponds to an indication of the master vessel change and also comprises all data needed by slave vessels to refer to the new master vessel (new "Bull's Eye", new shooting time prediction . . . ).

According to a particular feature, said at least one piece of information is related to a progressive change, in time, of master vessel from old master vessel M to new master vessel M'.

Thus, this particular embodiment where the transition between old and new master vessel is progressive, allows not missing some shots by taking account of the positions of old and new master vessels, thus ensuring a regular production without discontinuity.

This particular embodiment is efficient especially when new and old master vessels are not aligned, or very staggered.

According to a particular feature, said at least one piece of information corresponds to a target location as a function of a reference point of the new master vessel M' and a new shooting time prediction or the series of shooting time predictions as a function of the shooting time prediction or the series of shooting time predictions of the new master vessel M'.

Thus, this particular embodiment (in a "centralized mode") allows all vessels to refer to a new master vessel, as the old one is no more able to acts as the reference. For that, new values referring to the new master vessel for "Bull's Eye" and shooting time are transmitted to all vessels.

According to a particular feature, the method also comprises, for at least one slave vessel, at least a step of transmitting, to the other vessels of said multi-vessel seismic system, its reference point and its shooting time prediction, and for at least one slave vessel receiving said at least one piece of information:
- a) computing a new slave vessel target location, at least as a function of a reference point of the new master vessel M';
- b) computing a new slave vessel shooting time prediction or a new series of shooting time predictions, at least as a function of the shooting time prediction or the series of shooting time predictions of the new master vessel M', a reference point being used to calculate the ideal position for a vessel.

Thus, this particular embodiment (in a "distributed mode") allows all vessels to refer to a new master vessel, as the old one is no more able to acts as the reference. For that, some new parameters required to ensure a good production, need to be computed again, as a function of the new master vessel instead of as a function of the old master vessel.

These parameters are required in order that slave vessels can compute their own position and time to shot to generate their coverage. Indeed, each slave vessel has to match as possible this target at the right time, and need these parameters.

As the master vessel is being to change, slave vessels need to compute again these parameters referring to the new master vessel.

Moreover, in this "distributed mode", all vessels need to transmit, for example to a vessel where a "supervision tool" is located, some data (reference point, shoot time prediction, speed vessel . . . ) needed to calculate, on the vessel where is located the supervising tool, the piece of information further transmitted to all vessels. For example, all vessels transmit this data in a cyclic way, for example every second.

According to another embodiment, the method comprises, for at least one slave vessel receiving said at least one piece of information:
- c) computing a new slave vessel optimum speed, at least as a function of the new master vessel M';
- d) computing a new slave vessel time to reach a point, at least as a function of the new master vessel M'.

According to a particular feature, in case of progressive change:
- step a) comprises at least an iteration of a sub-step a') of computing at least one intermediate slave vessel target location, at least as a function of the reference point of the old master vessel M and of the reference point of new master vessel M';
- step b) comprises at least an iteration of a sub-step b') of computing at least one intermediate slave vessel shooting time prediction or at least one intermediate slave vessel series of shooting time predictions, at least as a function of the shooting time prediction of the old master vessel M and of the shooting time prediction of the new master vessel M', or of the series of shooting time predictions of the old master vessel M and of the series of shooting time predictions of the new master vessel M'.

Thus, this particular embodiment (in a "distributed mode") allows the progressive change to be efficient, by computing intermediate values for some required parameters (reference point, time shot predictions, . . . ) allowing a regular production without discontinuity.

For example, two intermediate values are computed for the target location of a slave vessel, in order that the new reference point for that slave vessel moves progressively from the reference point corresponding to the old master vessel to the reference point corresponding to the new master vessel, thus ensuring not to miss some shots.

According to another embodiment, the method comprises:
- step c) comprises at least an iteration of a sub-step c') of computing at least one intermediate slave vessel optimum speed, at least as a function of old and new master vessels;
- step d) comprises at least an iteration of a sub-step d') of computing at least one intermediate slave vessel time to reach a point, at least as a function of old and new master vessels.

According to a particular feature, the method comprises a step of determining a virtual master vessel at least as a function of the old master vessel M and the new master vessel M' and in that, during the progressive change of master vessel and for at least one vessel of the multi-vessel seismic system, the sub-step b') takes account of the shooting time prediction or series of shooting time predictions of the virtual master vessel.

Thus, this particular embodiment (in a "distributed mode" or a "centralized mode") provides for a virtual master vessel computed from both old and new master vessels, the virtual master vessel being used to compute the progressive change. Thus, the time prediction of the virtual master vessel will be used as effective shooting time prediction for all vessels.

For example, the virtual master vessel will be computed as a pondered average of old and new master vessels projected on the sail line for each vessel, during the transition or the progressive change of master vessel. According to a particular embodiment, the weighting depends on the progress of the transition, i.e. the weighting is different if the progressive change is at its beginning or if the progressive change is at its end.

Thus, during transition, all vessels align their final shot time predictions on the virtual master, acting as if the virtual master was driving all the shot time scheduling. This includes old and new master vessels.

For example, said step of determining a virtual master vessel comprises at least:
- a step of computing a virtual master vessel reference point, at least as a function of the old master vessel reference point and of the new master vessel reference point;
- a step of computing a virtual master vessel shooting time prediction or a virtual master vessel series of shooting time predictions, at least as a function of the time to reach a point for the old master vessel and the time to reach a point for the new master vessel.

Thus, this particular embodiment (in a "distributed mode" or a "centralized mode") allows all vessels to refer to the virtual master vessel, as the required parameters are computed as a function of the virtual master and ensures that all vessels will be able to match as possible this target at the right time.

According to another embodiment, the method comprises:
- a step of computing a virtual master vessel position, at least as a function of the old master vessel position and of the new master vessel position;
- a step of computing a virtual master vessel optimum speed, at least as a function of the old master vessel optimum speed and of the new master vessel optimum speed.

According to a particular feature, said step of determining a virtual master vessel takes account of two or more listener vessels of the system.

According to this embodiment, the virtual master vessel is computed using all the vessels of the system, thus allowing to share coverage error.

For example, each vessel of the system implements said step of determining a virtual master vessel.

According to this embodiment, the virtual master can be computed concurrency on each vessel with a distributed algorithm, so that all vessels, old master, new master, and other slave vessels can compute themselves their virtual master vessel in order to have their own reference.

According to a particular feature, the number of iterations of sub-steps a') and/or b') depends on at least one criterion pertaining to the group comprising:
- a predetermined distance to perform the progressive change;
- the speed of at least one vessel of the system;
- a minimum shot time interval for at least one vessel of the system;
- the real shot time interval for at least one vessel of the system.

According to this embodiment, the progressive change of master vessel duration can be static, fixed or configured value, or any dynamic value depending of old and new vessel status, a for example the distance to performed the transition, the vessels speeds, the minimum shot time interval that vessels has to ensure and real shot time interval.

According to a particular feature, said predetermined event corresponds to a command emitted from any one of the vessels of the system and pertaining to the group comprising:
- a manual command issued by a user;
- an automatic command depending on the position of the old master vessel compared to a way point;
- an automatic command depending on a scheduled begin time for the master vessel change;
- an automatic command triggered by a failure detection for a monitored parameter of the old master vessel.

According to this embodiment, the change of master vessel can be triggered by any predetermined event, which can be related to a user action or an automatic and planned event.

In a first case, the event can be issued by a user, for example from a human interface software of a supervising tool located on master vessel or any other vessel involved in the operation.

According to another case, the event can be planned and automatically generated, depending on several possible parameters like:
- the location of the old master compared to a way point (any point on the sail line): when old master reaches this way point, an event is automatically generated to trigger the change of master vessel;
- a scheduled begin time for triggering the change of master vessel;
- a result of an automatic checking for any failures from old master vessel like: any positioning failure on equipment, any failure that impacts production. For example if the old master vessel decides not to follow the predefined path and has a course that differs from the navigation path azimuth, or if a distance across the line is too far . . . .

According to a particular feature, said step of selecting a new master vessel M' among the at least two slave vessels comprises at least an iteration of the following sub-steps:

- selecting the vessel with the higher priority in a predetermined vessels priority list,
- checking, for said selected vessel, at least one predetermined parameters,
- verifying that at least one vessel is shooting:
  - in case of negative verification, the selected vessel becomes the new master vessel M',
  - in case of positive verification and if the selected vessel is not turning, the selected vessel becomes the new master vessel M',
  - in case of positive verification and if the selected vessel is turning, selecting a next vessel in predetermined vessels priority list.

For example, the predetermined parameters pertain to the group comprising:
- the quality of radio link,
- the DGPS position quality,
- the reliability of sources positioning,
- the deployment status of the source,
- any other positioning or navigation failure on the system According to a particular feature, the method comprises a step of obtaining a snapshot of predetermined features of the old master vessel and in that said sub-steps a') and/or b') take account of an interpolation of said snapshot.

According to this embodiment, the virtual master vessel can be computed with a snapshot (including positions, speeds, and time to reach points) of the old master vessel, at the beginning of the progressive change. In this case, progressive change is not computed with an updated old master vessel, but it is computed with an interpolated old master vessel. This allows the old master vessel leaving quickly the operations or avoiding any radio communication failure, without any impacts to other vessels still in production.

This embodiment ensures the master vessel progressive change being independent from the evolution of the old master vessel, after the beginning of the progressive change.

In another embodiment, the present disclosure relates to a non-transitory computer-readable carrier medium storing a program which, when executed by a computer or a processor, causes the computer or the processor to carry out the above-mentioned method (in any of its different embodiments).

In another embodiment, the present disclosure relates to a multi-vessel seismic system comprising a master vessel M and at least two slave vessels, comprising the following means configured and adapted to manage a master vessel change, which are integrated in said at least one slave vessels of the system and activated during at least a part of a multi-vessel operation:
- means configured and adapted to select a new master vessel M' among the at least two slave vessels, triggered by at least one predetermined event;
- means configured and adapted to transmit at least one piece of information indicating that the master vessel is changing to become the new master vessel M'.

Advantageously, the multi-vessel seismic system comprises means for implementing the steps of the above-mentioned method, in any of its different embodiments.

4. LIST OF FIGURES

Other features and advantages of embodiments of the disclosure shall appear from the following description, given by way of indicative and non-exhaustive examples and from the appended drawings, of which:

FIGS. 1a and 1b, already discussed in relation to the prior art, shows two ways for the projection of the master vessel reference point;

FIGS. 5a and 5b illustrate a third example of a first particular embodiment of a master vessel change management method, for a non-progressive change, with missing shots;

6. DETAILED DESCRIPTION

The disclosure relates to a method for managing a master vessel change in a multi-vessel seismic system comprising a master vessel M and at least one slave vessel, during at least a part of a multi-vessel operation.

Figure 1A:
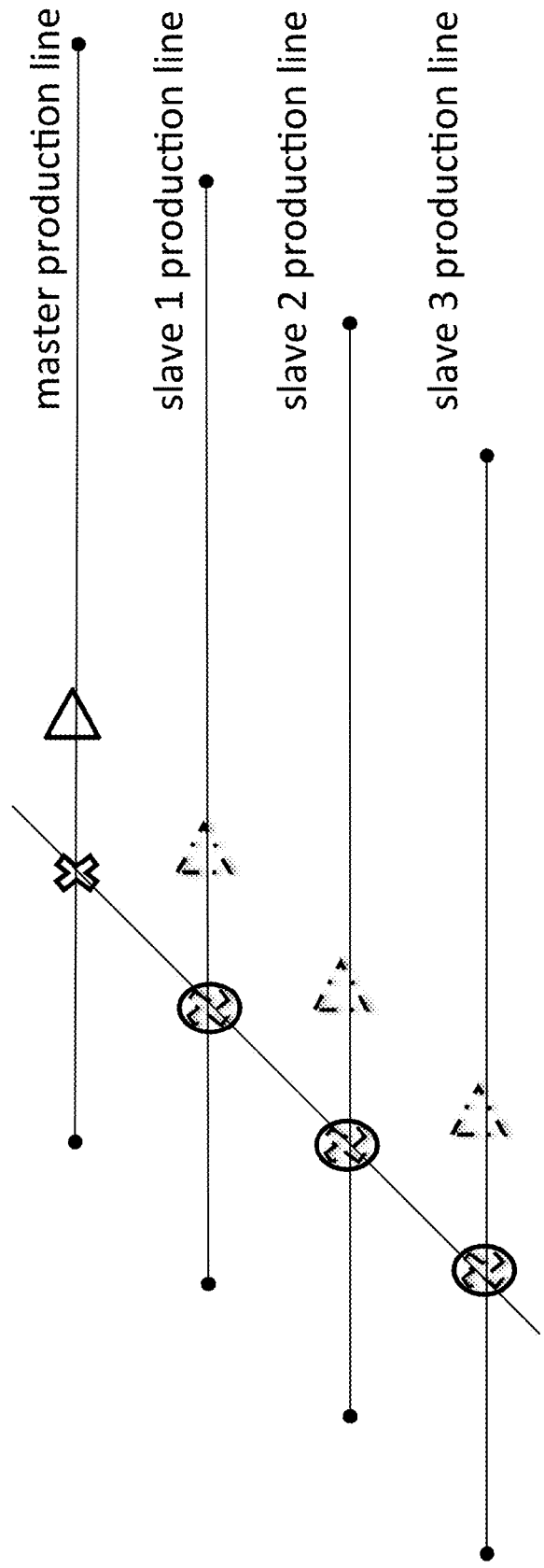
Figure 1B:
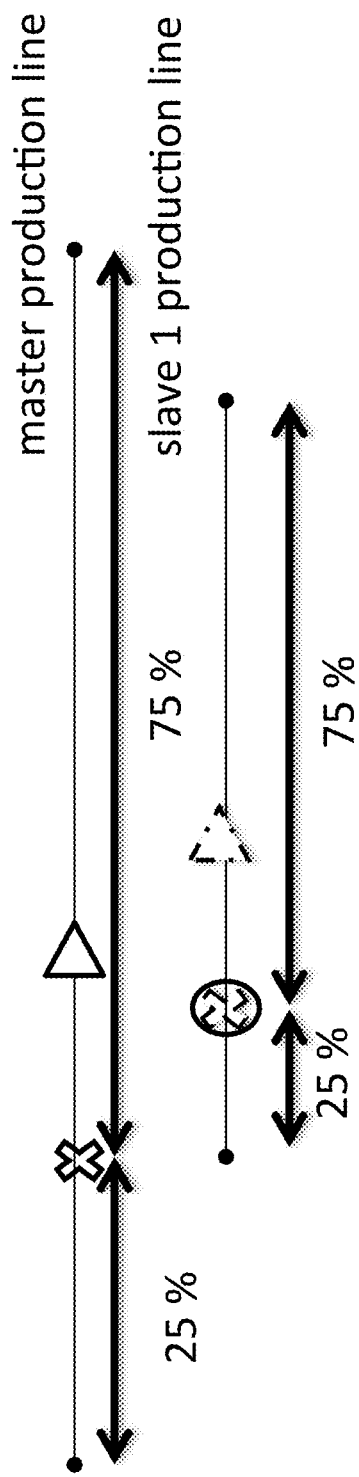
Figure 2A:
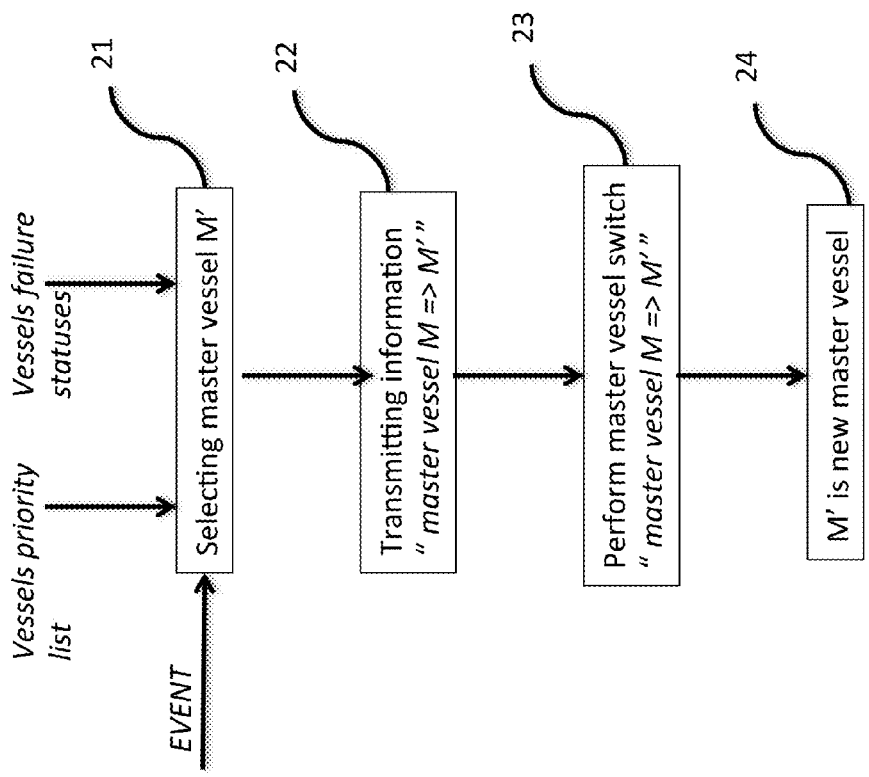
FIGS. 2a and 2b are flowcharts of a master vessel change management method according to two particular embodiments of the disclosure, respectively for a non-progressive and a progressive change.

Referring now to FIG. 2a, we present a first particular embodiment of an algorithm for managing a master vessel change from an old master vessel M to a new master vessel M', in the case of a non-progressive change. This algorithm is executed by at least one vessel of the system, according to two types of operating: a centralized operating type (or centralized mode) where only one vessel executes the algorithm and transmits the results to other vessels or a distributed operating type (or distributed mode) where each vessel of the system executes the algorithm.

In a selecting step 21, triggered by an event "EVENT", a new master vessel M' is selected, among the other vessels of the system.

In a general way, the event is representative of a problem occurring on the current master vessel M, thus potentially leading to dysfunctions in the survey.

For example, the master vessel M may be disturbed or stopped in its production path (for example because of an unexpected obstacle). In such cases, the master vessel M is no more able to act as a reference for the other vessels of the system. A change of master vessel is thus needed and allowed by this embodiment of the disclosure.

Another example corresponds to a known multi-vessels operation configuration where vessels are staggered with a quite long inline offset. In this configuration, when the master vessel M, ahead of all the other vessels, turns as scheduled, it is no more in the production area, thus perturbing the reference for the other vessels because of its turning. Indeed, its position is not still relevant to align other vessels that are still in line and producing. This case is illustrated by FIGS. 4a to 4e later more described. Thus, to allow the master vessel M to turn as soon as possible in order not to lost time and not to use too much fuel, a change of master vessel is thus needed and allowed by this embodiment of the disclosure.

The event triggering the master vessel change can be manually or automatically generated. Moreover, the event may be generated from a supervising tool located on master vessel M or any other vessel involved in the operation.

For example, the event is performed by a user from human interface software of said supervising tool, following any accident onboard the vessel.

In another example, the event is planned in the software of the supervising tool and automatically generated, depending on some parameters like the location of the current (old) master vessel M compared to particular point, called a way point, or a scheduled begin time.

The event can also be automatically generated by the software by checking any failures from current (old) master vessel M, as any positioning failure on equipment, any failure that impacts production, or because the current (old) master vessel M has decided not to follow its path and has for example a course that differs from the navigation path azimuth or a distance across the line that is too far . . . .

Whatever the source of the event, it triggers a master vessel change because the current (old) master vessel is no more able to be a referent for the other vessels of the system.

A new master vessel M' is thus selected to become the new reference for slave vessels.

The choice of the new master vessel M' can be done:
arbitrary by user, who chooses manually the new master vessel M' from the list of the vessels,
by a predefined vessels priority list.

This choice, or selection, of the new master is illustrated for example in FIG. 11, described in more details later in the description.

Then, in a transmission step 22, a piece of information related to a master vessel change from the old master vessel M to the new master vessel M' is transmitted to at least one of the vessels of the system. For example, if the selecting step has been executed from a supervising tool on the old master vessel M, the old master vessel M transmits, to all the vessels of the system, the piece of information related to a master vessel change.

In other words, all vessels of the system will be aware of the master vessel change and will need to change its reference to the master vessel in order to refer now to the new master vessel M'.

For that, different parameters need to be computed again, as a function of the new master vessel M' instead of as a function of the old master vessel M. These parameters are required in order that slave vessels can compute their own position and time to shot to generate their coverage. Indeed, each slave vessel has to match as possible this target at the right time, and needs these parameters.

In a distributed mode, the piece of information received by all vessels allows them to compute the parameters needed to refer to new master vessel. In this operation mode, the piece of information corresponds to data representing a transition (as a ramp or a crenel for example) between old and new master vessel, and allows all the vessels to compute the needed parameters (new Bull's Eye and new shooting time prediction).

In a centralized mode, the piece of information received by all vessels corresponds to the results of the computation of these parameters, i.e. new Bull's Eye and new shooting time prediction.

As the master vessel is being to change, slave vessels:
compute again these parameters referring to the new master vessel, in a distributed operation mode,
directly receive new values for these parameters referring to the new master vessel, in a centralized operation mode.

Indeed, these parameters allow slave vessels to refer to master vessel in order to respect their scheduled shots, in time and space. The Bull's Eye constitutes the space reference and the shooting time prediction constitutes the time reference. Thus, these parameters are computed from (as a function of) the new master vessel, and no more from the old master vessel.

Some other parameters are useful to ensure an optimum quality of the survey, even if the master vessel becomes not able to perform its operation during the survey.

For example, the optimum speeds to align slave vessels and/or the time to reach end of line can be computed again for the slave vessels, referring now to the new master vessel M'.

Indeed, the time to reach point, together with the speed and the distance to reach point, will be used for the computation of the shooting time predictions.

In a step 23 of performing the master vessel switch, slave vessels thus:
compute new parameters (Bull's Eye and shoot time prediction) referring to the new master vessel, in a distributed operation mode,
take account of the new values received for the parameters (Bull's Eye and shoot time prediction), in a centralized operation mode.

Then, in a step 24, the new master vessel is the vessel M'.

Whatever is happening to the old master vessel, the multi-vessels operation can continue, without interruption or discontinuity, the slave vessels referring now to the new master vessel M'.

With this embodiment, it is possible to ensure a regular shooting for all vessels, by ensuring that each vessel respects a minimum and a maximum time between shots.

Figure 2B:
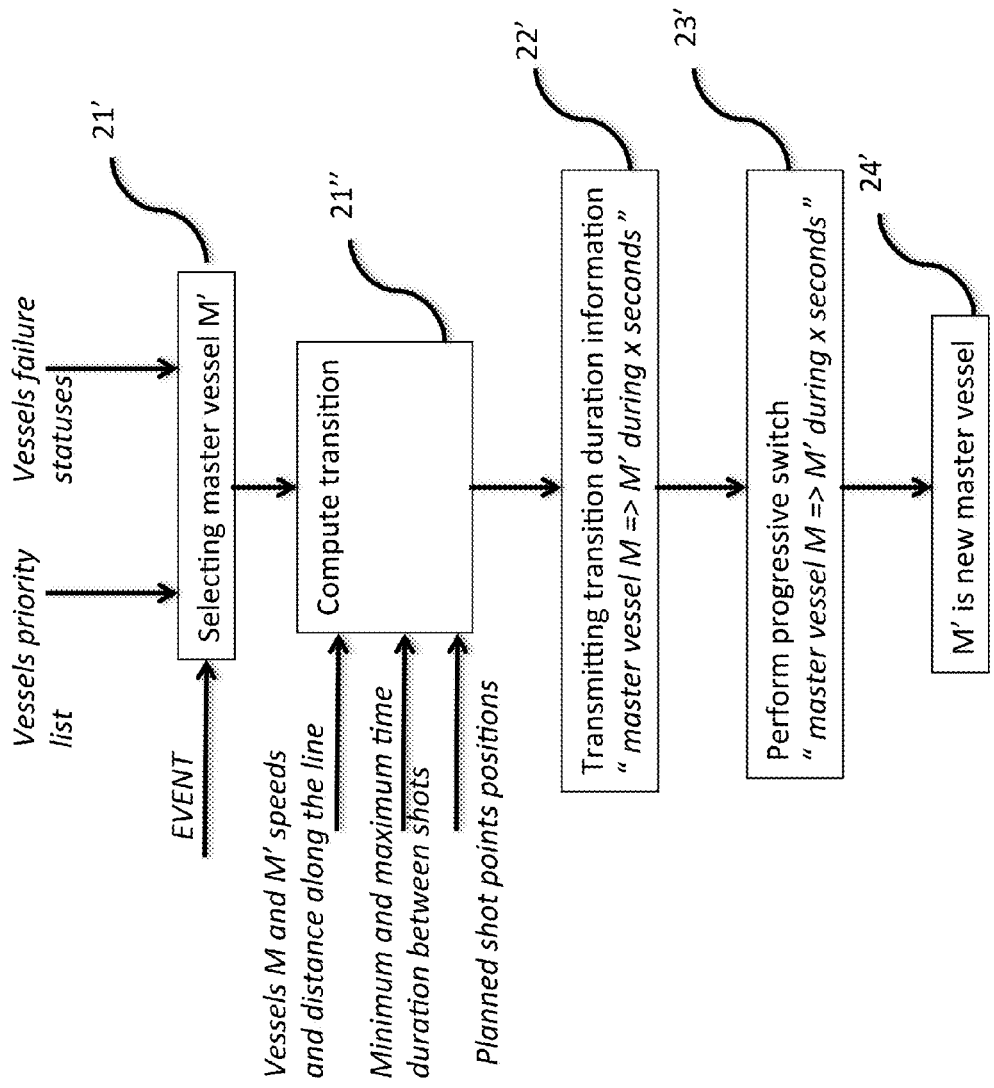

Referring now to FIG. 2b, we present a second particular embodiment of the disclosure, in which the change of master vessel from the old one to the new is made progressively, so that the reference for slave vessels does not switch directly from the old master vessel to the new master vessel.

In this embodiment, additional steps are added to the process of FIG. 2a (non progressive mode embodiment) and are described here below.

First, the step 21' of selecting a master vessel M' corresponds to the step 21 of FIG. 2a and is not detailed here again.

Then, a step 21" allows to compute the duration of a progressive transition between old and new master vessel. This transition duration can be computed from:
vessels M and M' speeds,
distance along the line of the vessels,
planned and shot point positions,
minimum and maximum time duration between shots to be respected.

Figure 12:
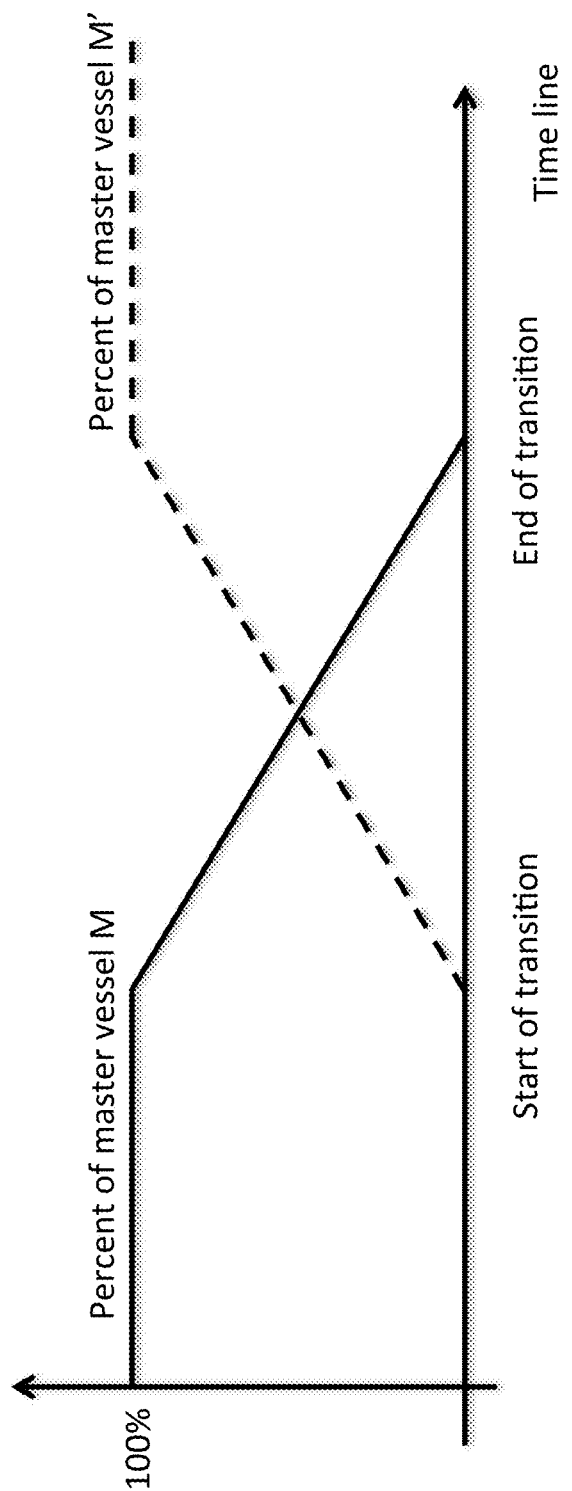
FIG. 12 is chronogram illustrating a representation of the transition duration send to all vessels by the supervising tool.

Next, the message "switch from M to M'" is sent, during a step 22' corresponding to the step 22 of FIG. 2a except that, in this particular embodiment, the message describes the progressivity of the transition, the transition duration and the initial time and end time of the switch, as illustrated in FIG. 12 (described later in the description). The progressive switch transition can be a ramp as in FIG. 12, or a more complex, nonlinear curve.

Figure 6:
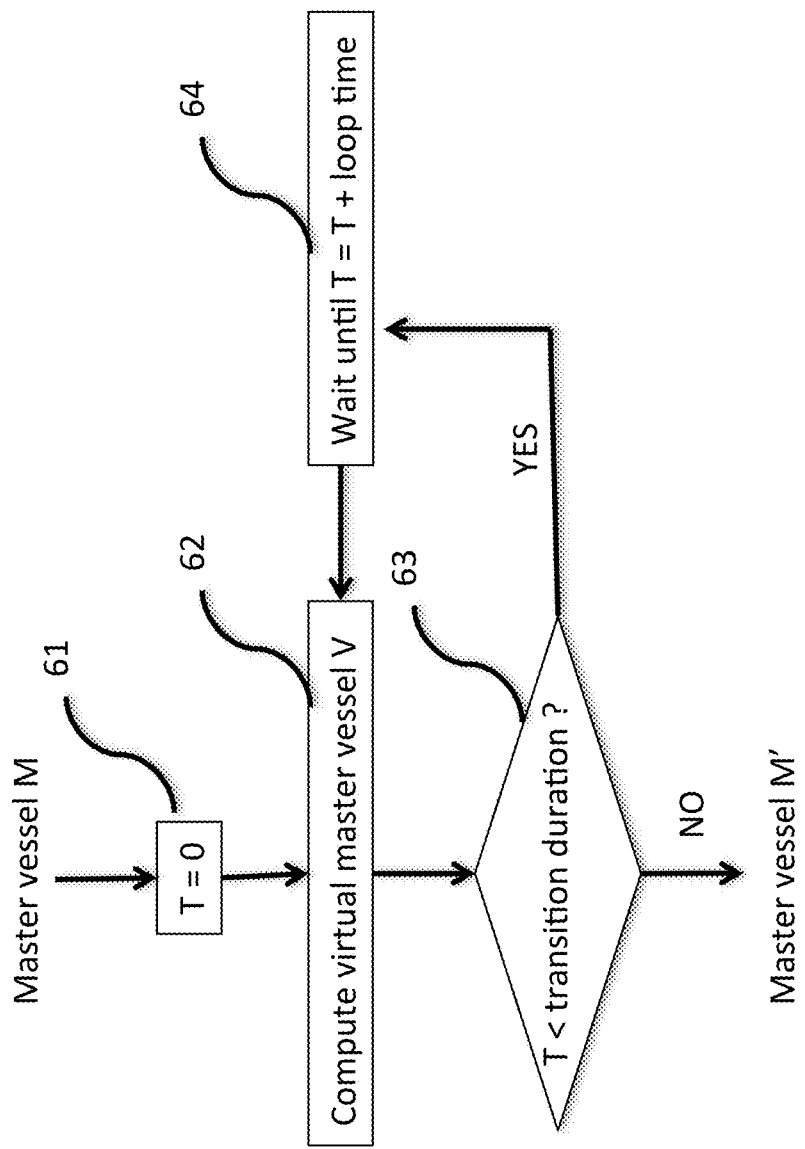
FIG. 6 is a flowchart of an example of a virtual master vessel computation according to a second particular embodiment of the disclosure, for a progressive change.

Next step 23' of this process is the performing of master vessel switch from M to M', corresponding to the step 23 in FIG. 2a except that, in this particular embodiment, the switch is performed progressively, as illustrated in FIG. 6 (described later in the description).

Then, in a step 24' (corresponding to step 24 of FIG. 2a), the new master vessel is the vessel M'.

Figure 11:
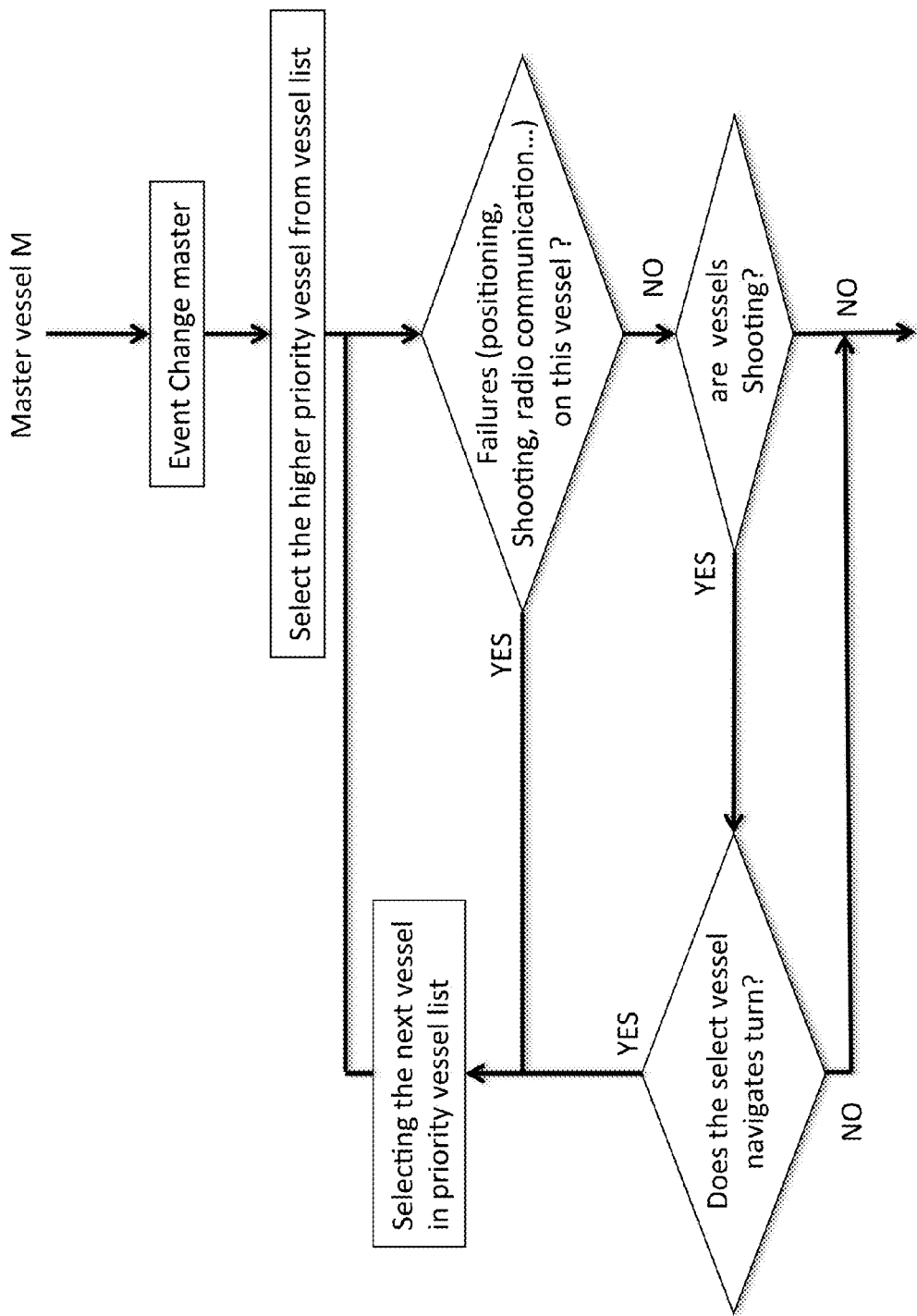
FIG. 11 is a flowchart of an example of a master vessel selection method embodiment.

Referring now to FIG. 11 which explains in more details the step 21 (respectively 21') of "Selecting master vessel M'" of FIG. 2a (respectively 2b), we present a particular embodiment of an algorithm to perform an automatic master vessel change from a priority list of vessels set by user.

Typically the higher priority vessels are the less maneuverable vessels (vessels equipped with streamers).

First step is to select the vessel with the higher priority in the list, after receiving an event for changing of master vessel. Next step is to ensure there are no failures on this first selected vessel. Typically checked items may be:
the quality of radio link to this vessel,
its DGPS position quality,
the reliability of sources positioning,
the deployment status of the source,
or any other positioning or navigation failure on the system.

Next step is to check if the vessels are still shooting and vessel fleet is still in productions.

If not, the selected vessel is chosen as the new master vessel.

Else, next step is to check that the selected vessel is not turning.

If the selected vessel is turning, it means that it is not properly aligned on other vessels that are still steering line. Thus, the first selected vessel cannot become the new master vessel, and the system selects the next vessel from the priority list and performs the same checks.

If the selected vessel is not turning, the selected vessel is chosen as the new master vessel.

Figure 3A:
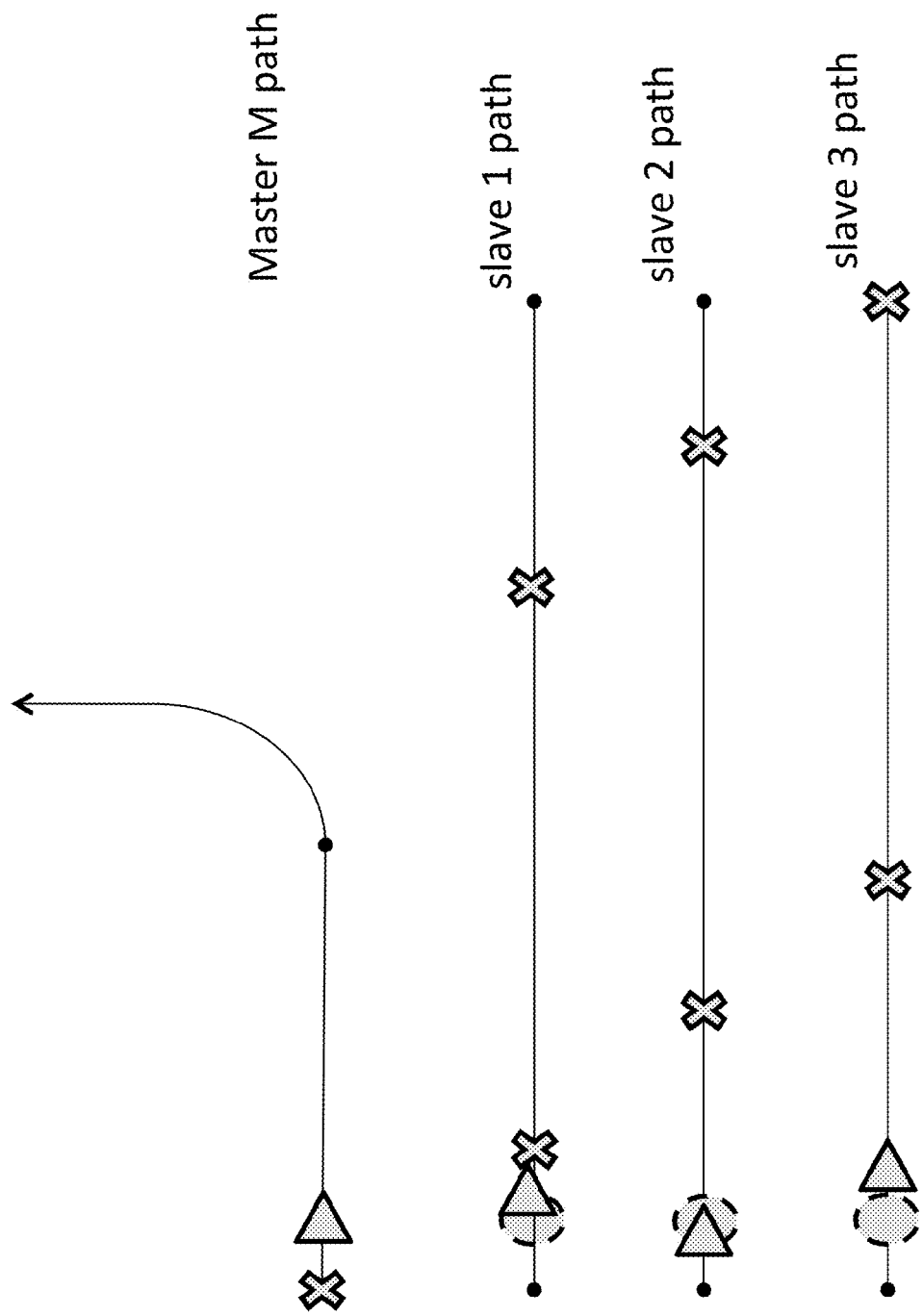
FIGS. 3a to 3c illustrate a first example of a master vessel change management method.
Figure 3B:
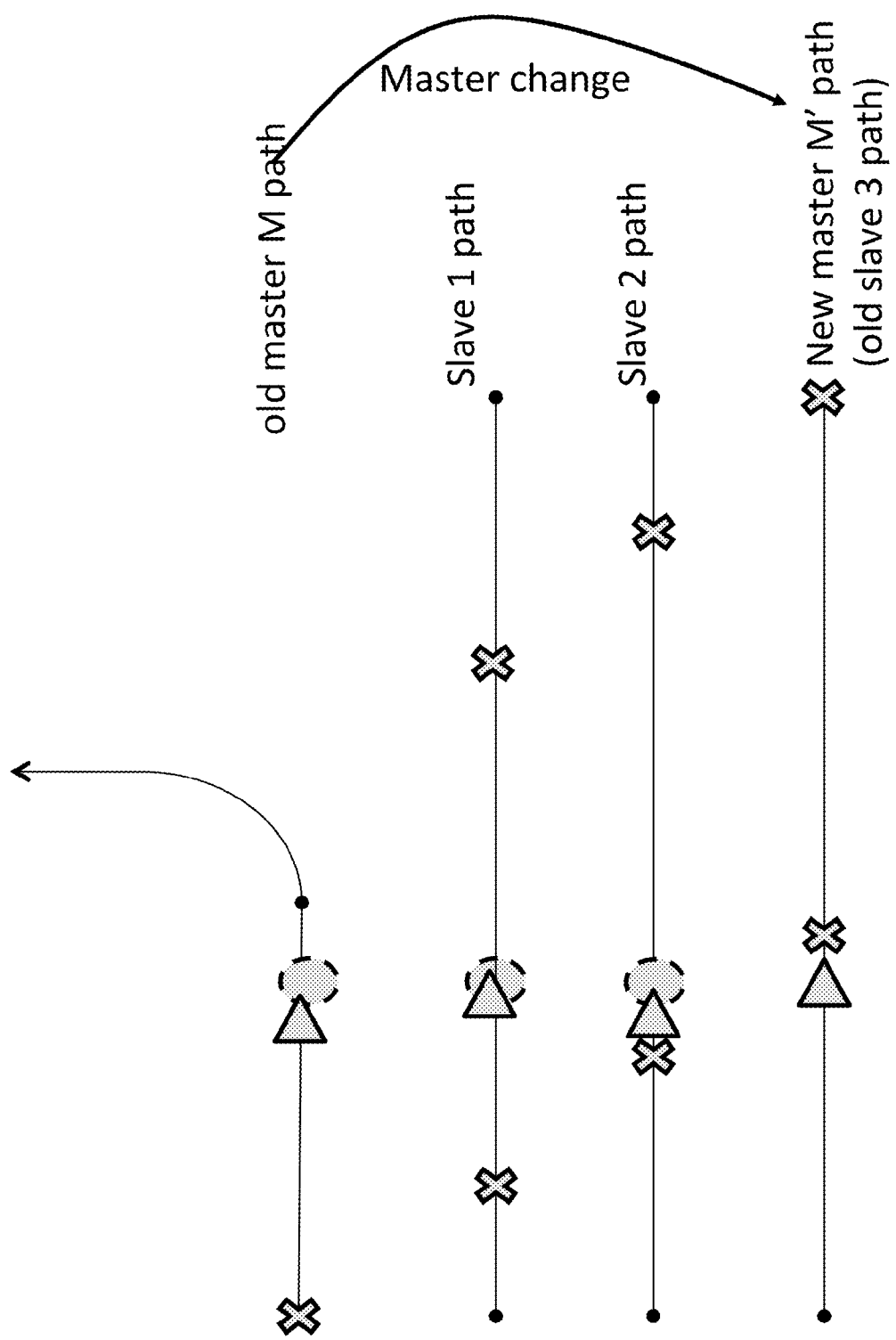
Figure 3C:
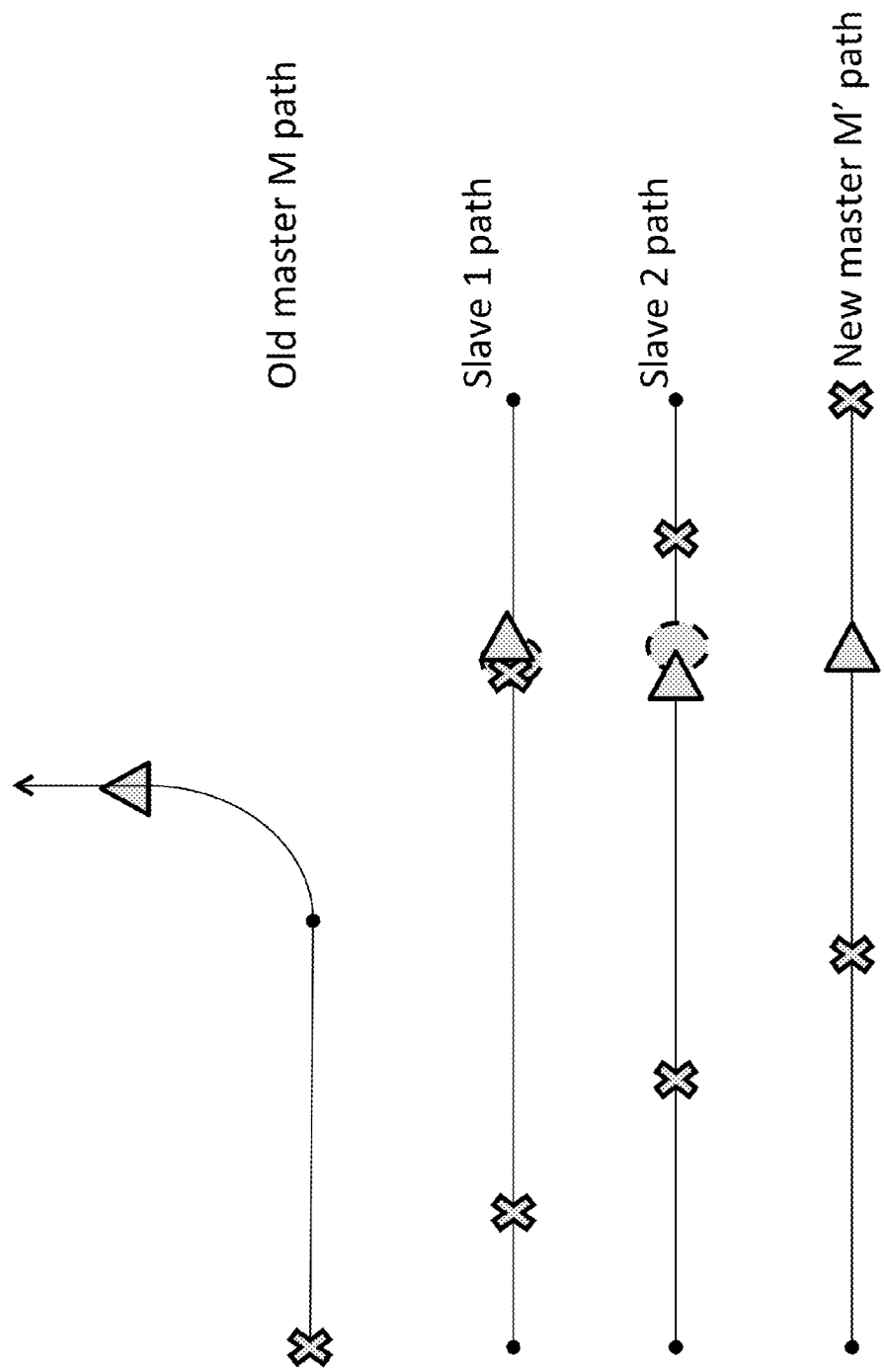

Referring now to FIGS. 3a to 3c, we present a master vessel change management method from old master vessel M to new master vessel M' according to a first example, either in a non-progressive or progressive mode. FIGS. 3a to 3c illustrate three different moments of a survey.

In this first example, the system comprises four vessels, including the master vessel M and three (1, 2, 3) slave vessels. As indicated above, the triangles represent the vessels. On the master vessel M path, the cross represents the master M reference point. On the slave paths, the crosses represent shot points and the ovals represent the "Bull's Eye", for each slave vessel.

FIG. 3a represents the initial state, where all slave vessels are aligned on the master vessel M. As can be seen on this FIG. 3a, the scheduled master vessel M path is different from the slave paths in that a turn is scheduled for the master vessel M. In such a case, according to the known solutions, the operation is stopped for all vessels, when the master vessel M begins its turn.

According to this embodiment, a master vessel change is executed, from old master M to new master M', selecting from the slave vessels 1, 2 and 3 (for example according to the algorithm illustrated in FIG. 11 and previously described), just before the turn of the master vessel M.

As illustrated in FIG. 3b, the slave vessel 3 is selected to become the new master vessel M'. Thus, the slave vessels 1 and 2 need now to refer to the new master M' and no more to the old master M.

For that, and as explained above, the target locations are computed again for slave vessel 1 and slave vessel 2, as a function of the new master M' reference point. It is the same for the shooting time predictions, for slave vessel 1 and slave vessel 2, as a function of the new master M' shooting time predictions.

Thus, as illustrated in FIG. 3c, where the old master is leaving the survey, all other vessels can still continue their production, referring now to the new master vessel M' (old slave vessel 3).

Referring now to FIGS. 4a to 4e, we present a master vessel change management method from old master vessel M to new master vessel M' according to a second example, either in a non-progressive or progressive mode. FIGS. 4a to 4e illustrate five different moments of a survey.

In this second example, the system comprises four vessels, including the master vessel M and three (1, 2, 3) slave vessels, all vessels being staggered.

Figure 4A:
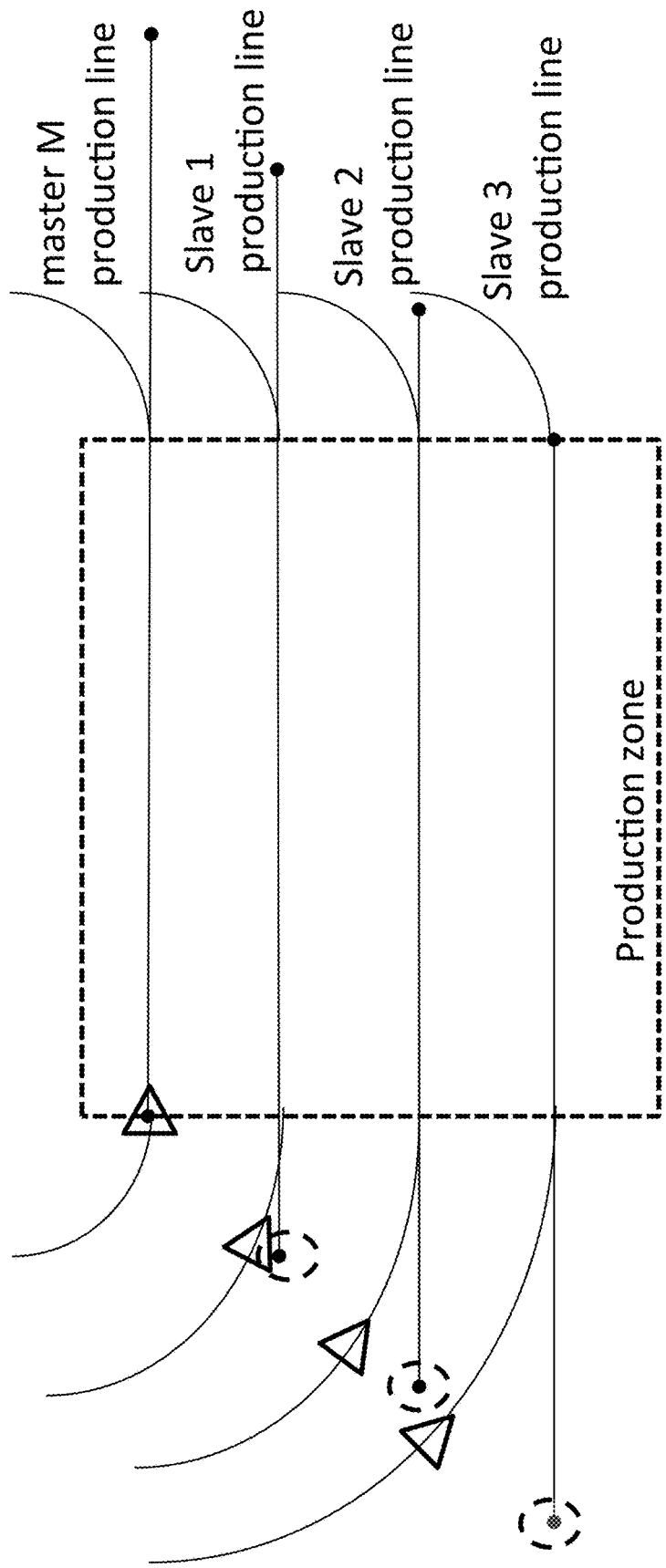
FIGS. 4a to 4e illustrate a second example of a master vessel change management method.

FIG. 4a represents the initial state, where all slave vessels are aligned on the master vessel M, and wherein the production zone is represented with doted lines.

Figure 4B:
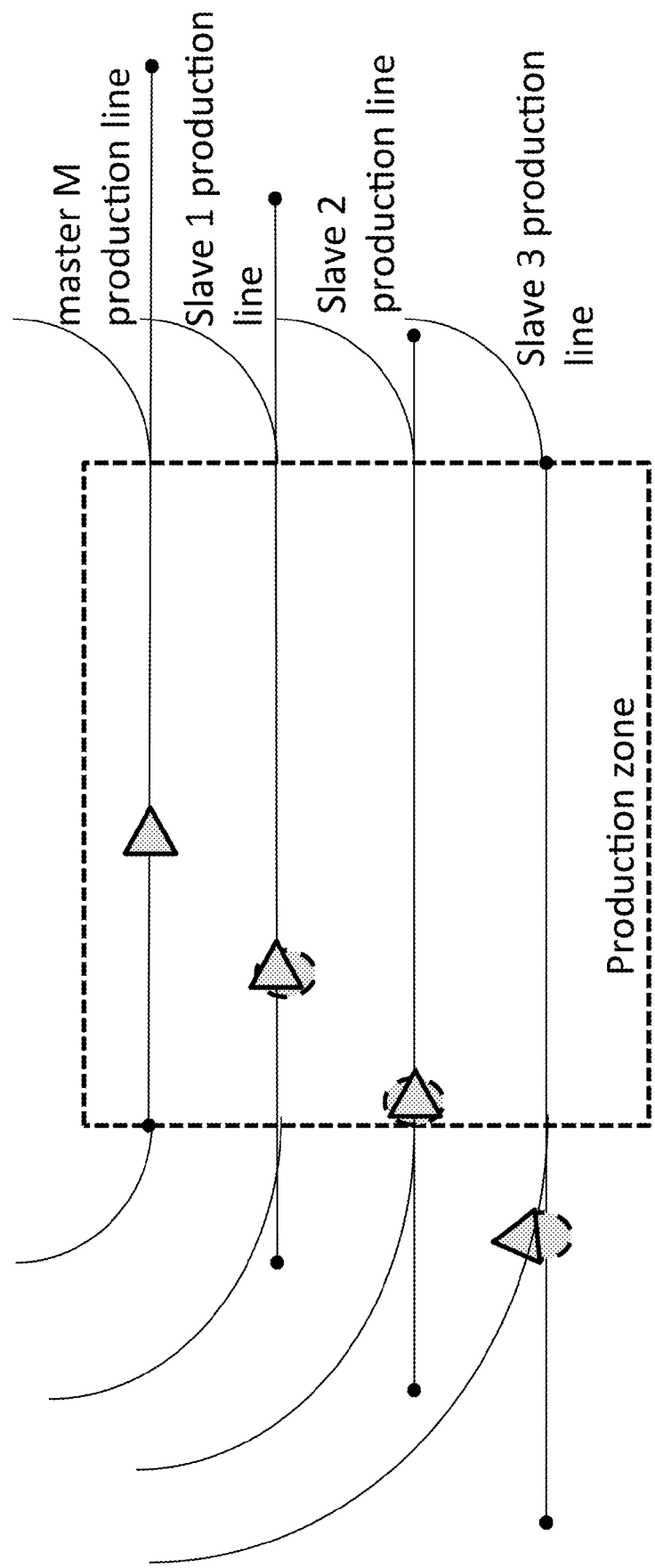

As illustrated on FIG. 4b, the production has started for the master vessel M and slave vessels 1and 2. Slave vessel 3 is not yet entered in the production zone.

Figure 4C:
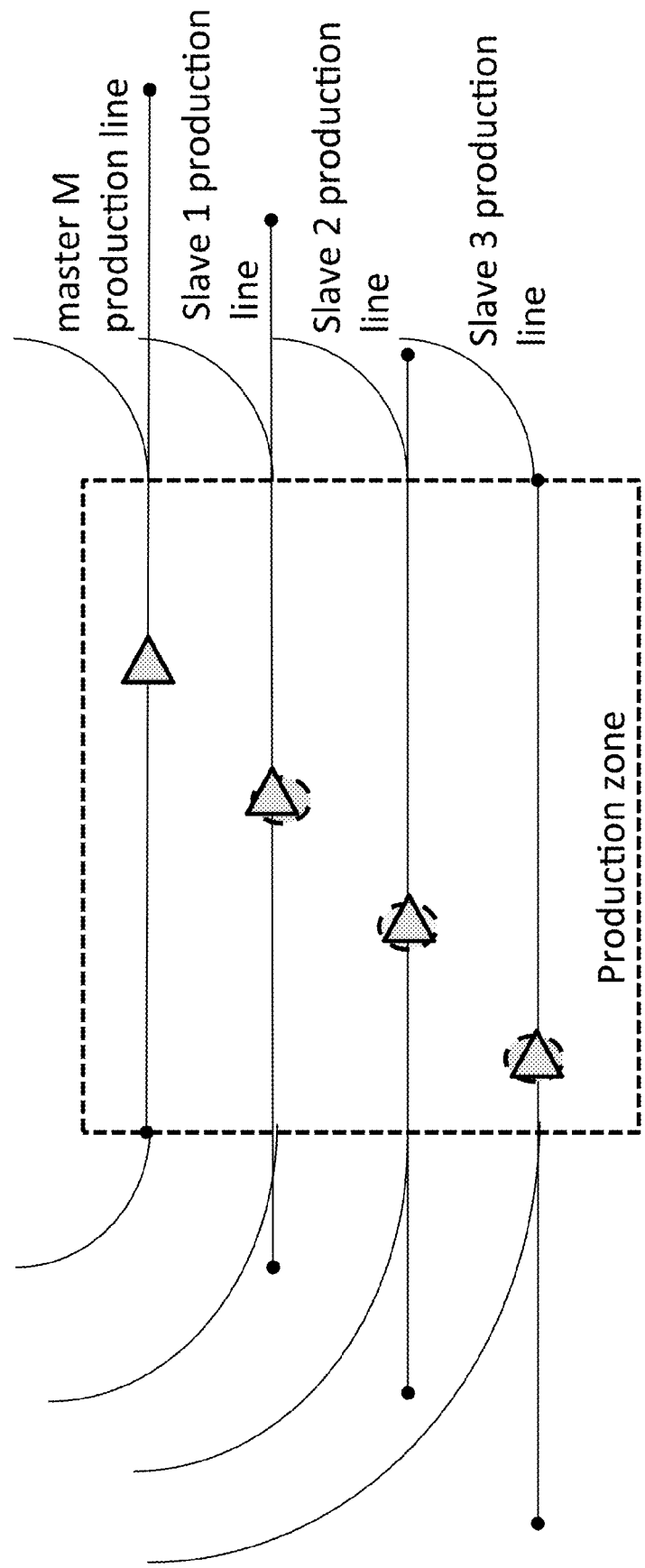

As illustrated on FIG. 4c, the production has started for all vessels. It can be seen on this FIG. 4c that the master vessel M will leave the production zone, and will not be able any more to be a reference for the other vessels.

Figure 4D:
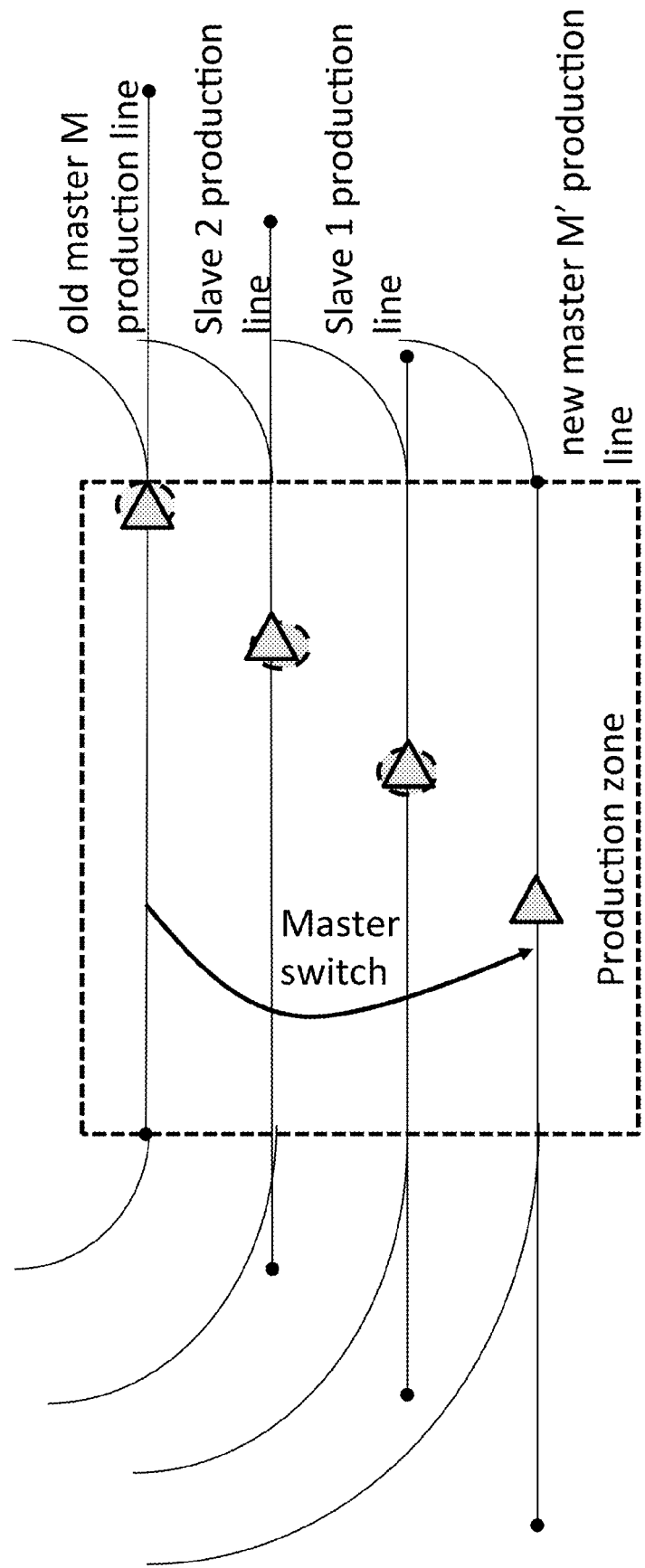

Thus, an event is generated to trigger a master vessel change, as illustrated in FIG. 4d, wherein it can be seen that the slave vessel 3 is selected to become the new master vessel M'. Thus, the slave vessels 1 and 2 need now to refer to the new master M' and no more to the old master M.

For that, and as already explained, the target locations are computed again for slave vessel 1 and slave vessel 2, as a function of the new master M' reference point. It is the same for the shooting time predictions, for slave vessel 1 and slave vessel 2, as a function of the new master M' shooting time predictions.

Figure 4E:
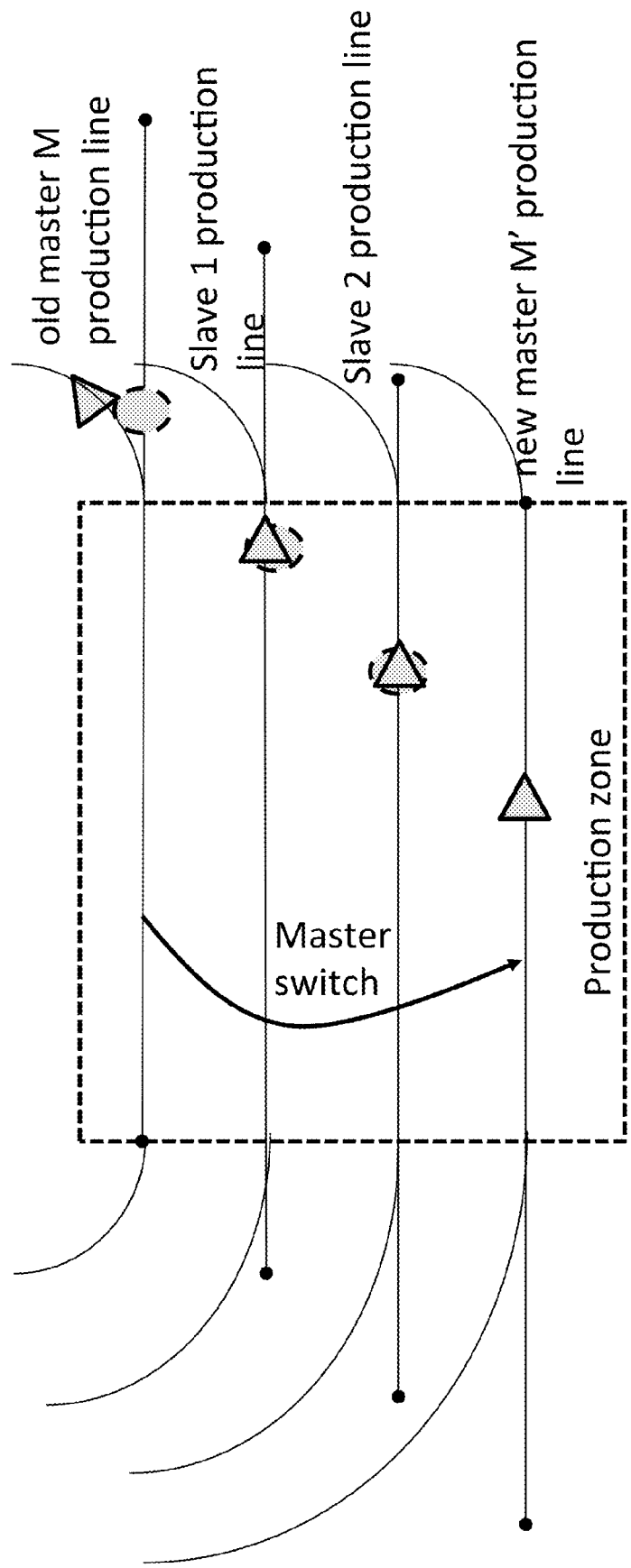

Thus, as illustrated in FIG. 4e, where the old master is leaving the survey, all other vessels can still continue their production, referring now to the new master vessel M' (old slave vessel 3).

Figure 5B:
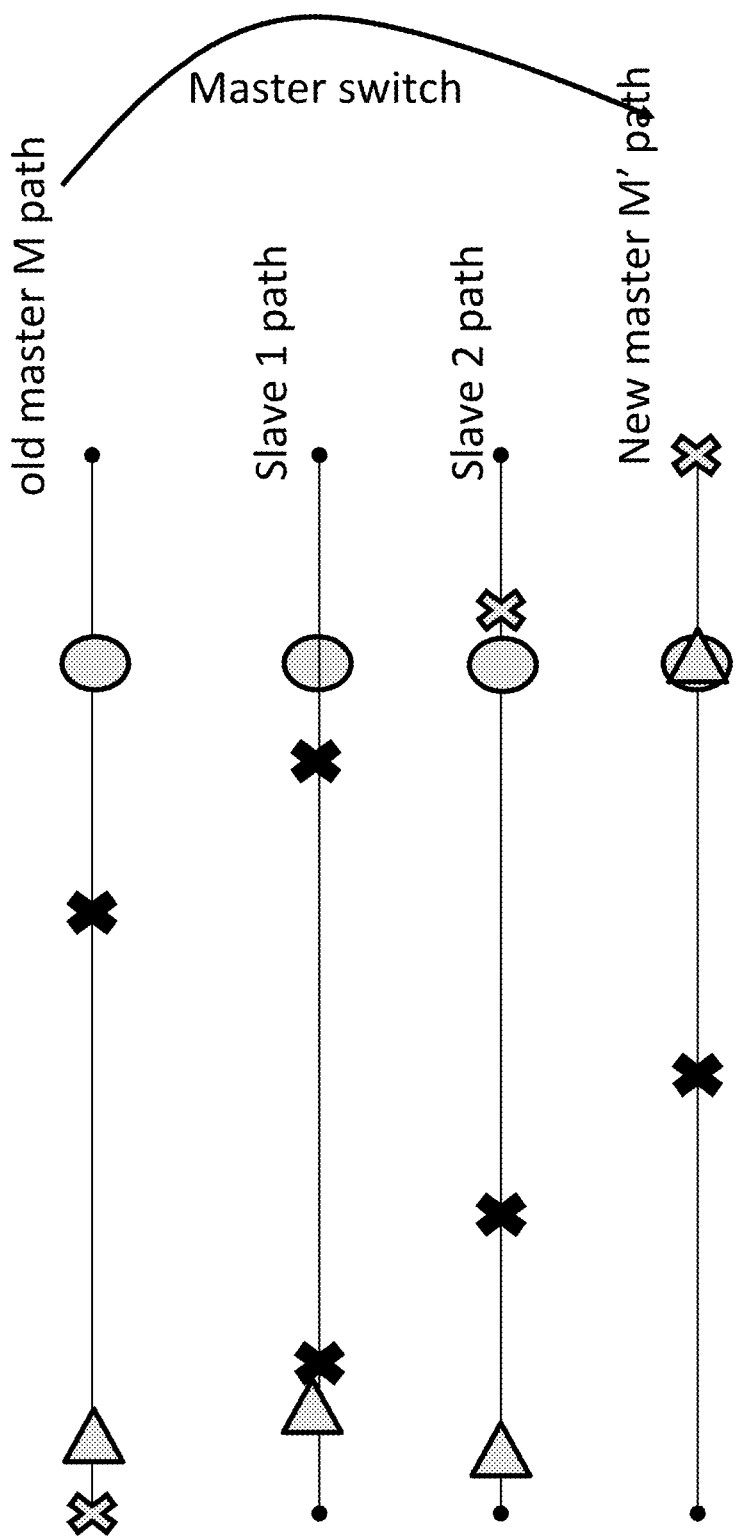

Referring now to FIGS. 5a and 5b, we present a third example of a master vessel change management method, wherein some shots are missed due to the master vessel change, in case of non-progressive change.

In FIGS. 5a and 5b, crosses represent shot points, i.e. theoretical points at witch vessels have to shot.

FIG. 5a represents the initial state, where all slave vessels, except slave vessel 3, are aligned on the master vessel M. Slave vessel 3 is ahead of its theoretical "Bull's Eye".

In case of a selection of slave vessel 3 as the new master vessel, as illustrated in FIG. 5b, it can be seen that some shots (for all vessels) are missed (represented by black crosses), due to the new reference point and the new computed "Bull's Eye" for old master, slave 1 and 2 vessels. As illustrated on FIG. 5a, only next shot points for slave 2 and new master vessels will occur.

Such missing shots, in such case illustrating a particular situation wherein the new master vessel is located ahead of the other vessels, can be avoided with the second particular embodiment of the master vessel change management method, allowing a progressive change, in time, of master vessel, and illustrated by FIG. 2b already described.

For example, according to this second embodiment (progressive change), the parameters required for a slave vessel to refer to a master vessel are computed as a function of the old master vessel and the new master vessel, in order to move progressively from the old master reference to the new master reference.

For example, two or more values of target location (as well as shooting time predictions) are computed for a slave vessel, wherein the percentage of the old master vessel reference point is decreasing in each computation, while the percentage of the new master vessel reference point is increasing, as illustrated for example in FIG. 12, described later.

These successive, also called intermediate, values can be computed during all the transition from old master vessel to new master vessel. In that case, these intermediate values can be taken for values corresponding to a "virtual" master vessel, being the reference for slave vessels during the progressive master vessel change from the old to the new master vessel M'. This notion of "virtual master vessel" will be explained in more details later in the description.

Such a virtual master vessel can be computed (parameters such as positions and predictions) for example on the old master vessel, until it leaves the role to the new master vessel, or on the new master vessel, as it receives the "token" from old master vessel to start the progressive change.

In another example, such a virtual master vessel can be computed (parameters such as positions and predictions) concurrency on each vessel of the system with a distributed algorithm so that all vessels (old master vessel, new master vessel, and other slave vessels) compute themselves their virtual master vessel. Such a solution allows avoiding any radio communication issues.

For example, the supervising tool located on any of the vessels of the system generates an event for a master change vessel and transmits, to all vessels of the system, periodically, a representation of the transition, in time, between old master vessel and new master vessel, as illustrated in FIG. 12. The progressive switch transition can be a ramp as in FIG. 12, where the percentage of the old master vessel reference point is decreasing in each computation, while the percentage of the new master vessel reference point is increasing, or a more complex, nonlinear curve.

Thus, at any time during the progressive change, any slave vessel can be aware of the status of the progressive change in order to compute its own parameters for referring to the virtual master vessel regardless of the quality of the radio link between vessels.

These different embodiments will be further described in more details.

In these examples, such a virtual master vessel can be computed with regular update of old master vessel during all the progressive change (case wherein the old master vessel is not leaving the production zone during the progressive change), or it can be computed with a snapshot of the old master vessel (including positions, speeds, and time to reach points) at the beginning of the progressive change. In this case, progressive change is not computed with an updated old master vessel, but with an interpolated old master vessel. This allows the old master vessel to leave quickly the operations or avoid any radio communication failure, without any impacts to other vessels still in production.

Referring now to FIG. 6, we present a flowchart of an example of the virtual master vessel computation according to the second particular embodiment of the disclosure, with progressive change of master vessel.

At the beginning of the progressive change (from the master vessel M to the master vessel M'), a step 61 is executed to start a transition time counter (T=0). At this time T=0, a first computation step 62 is executed to compute a virtual master vessel V.

For example, a parameter for this virtual master vessel, called $V_{Param}$, is computed, as a function of corresponding parameter for the master vessel M, called $M_{Param}$, and the master vessel M', called $M'_{Param}$:

$$V_{Param}=((1-(T/\text{Transition-Duration})*(M_{Param}))+(T/\text{Transition-Duration})*(M'_{Param}))$$

Such a parameter can be a reference point, a shooting time prediction, . . . .

In a test step 63, the current transition time counter T is compared to the transition duration, and if T is lower than this transition duration, then the transition time counter T is incremented, in step 64, with the loop time (T=T+loop-time). A new parameter for this virtual master vessel is computed (in a new iteration of step 62).

On the contrary, if the transition duration is reached, then the virtual master vessel becomes the new master vessel M' and the progressive change is finished.

Referring now to FIGS. 7*a* to 7*d*, we present an example of this second particular embodiment (progressive change) of a master vessel change management method, for computing reference points.

In this first example, the system comprises three vessels, including the old master vessel M (vessel 1), a slave vessel (vessel 2) and the new master vessel (vessel 3). As indicated above, the triangles represent the vessels. Dot symbols represent the virtual master vessel projections (on the slave vessel production line) and black symbols represent the old and new master vessels. The shot points are represented by "+" crosses associated with a number as "SP i". The "x" crosses represent the master reference points.

Figure 7A:
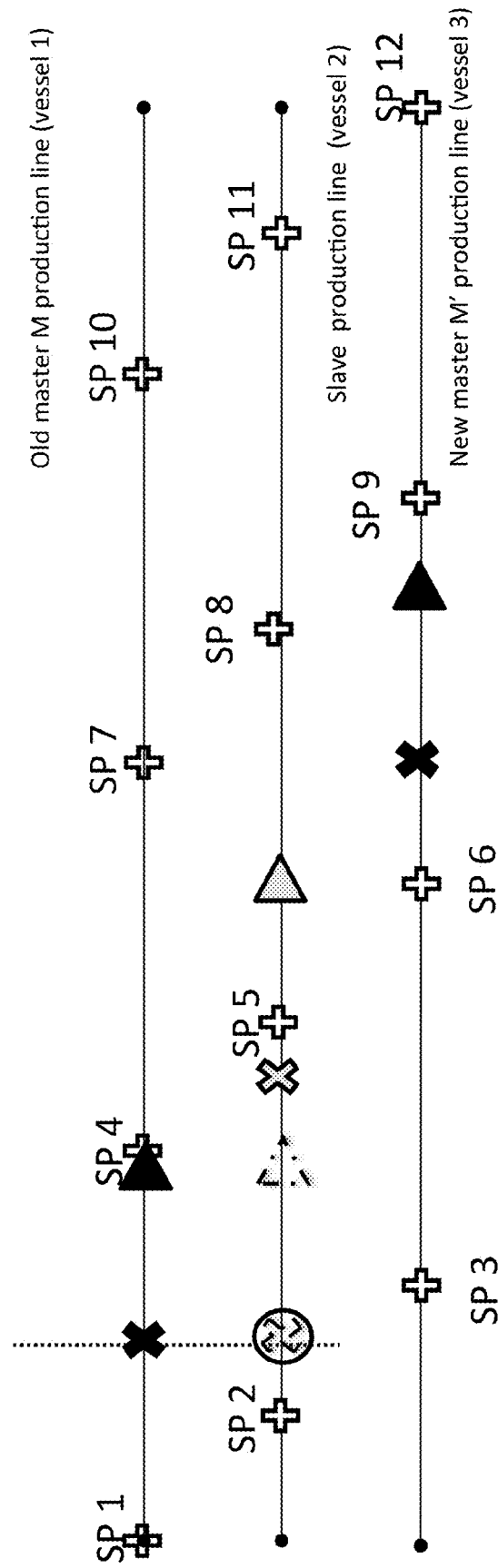
FIGS. 7a to 7d illustrate a first example of the second particular embodiment of a master vessel change management method, for computing reference points.

FIG. 7*a* represents the initial state, at T=0, where the virtual master vessel is computed as a function of the old master vessel. Indeed, as can be seen, the virtual master vessel is represented in dot lines, on the slave vessel production line, as the orthogonal projection of the old master vessel above. The "Bull's Eye" for the slave vessel corresponds to the orthogonal projection (represented by the vertical doted line) of the old master vessel reference point.

Figure 7B:
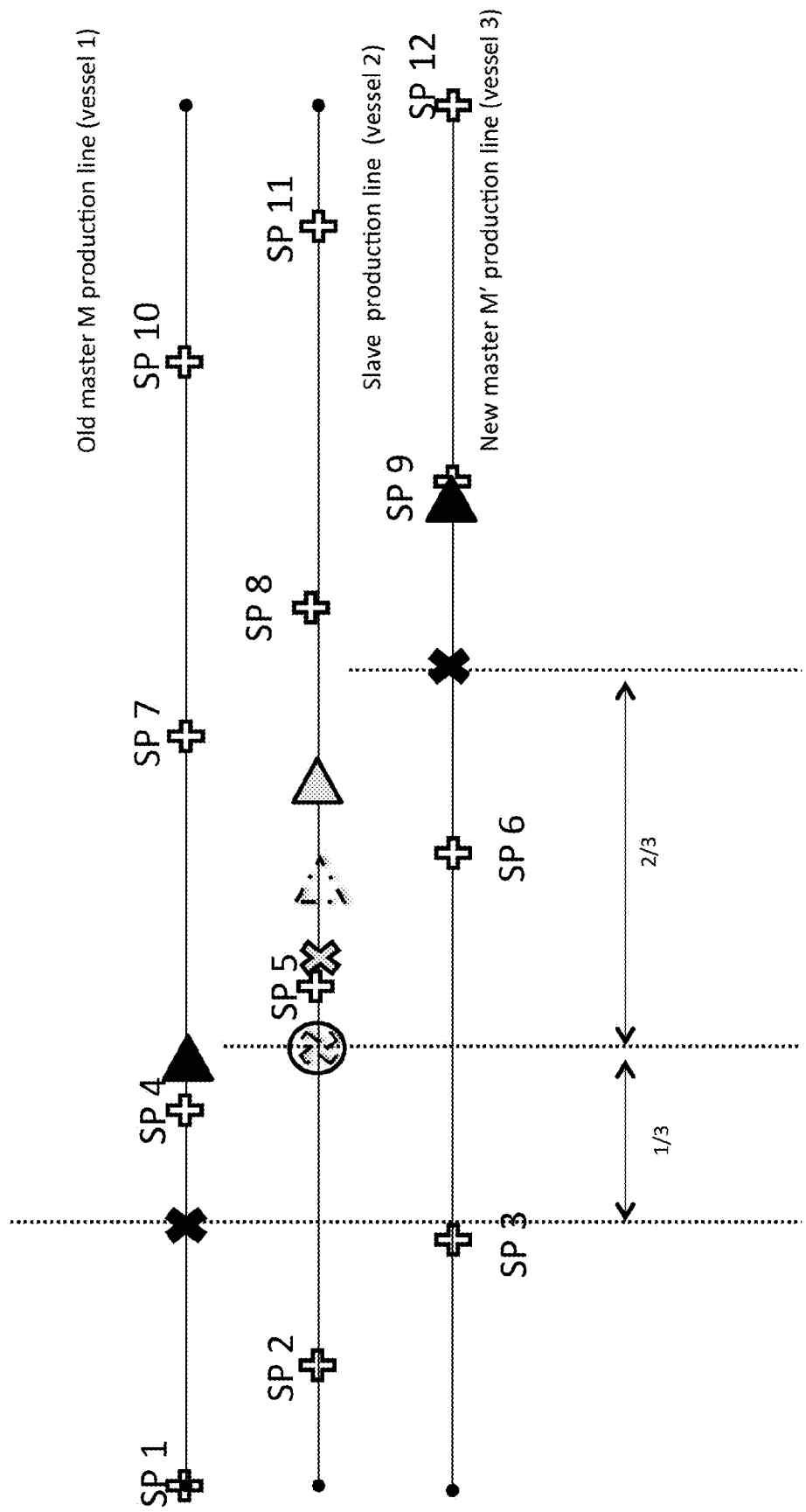

FIG. 7*b* represents the state at T=Transition-Duration/3, where the virtual master vessel is computed as a function of the old master vessel and the new master vessel. The "Bull's Eye" for the slave vessel corresponds to the projection of a pondered average of the old master vessel reference point and the new master vessel reference point.

Figure 7C:
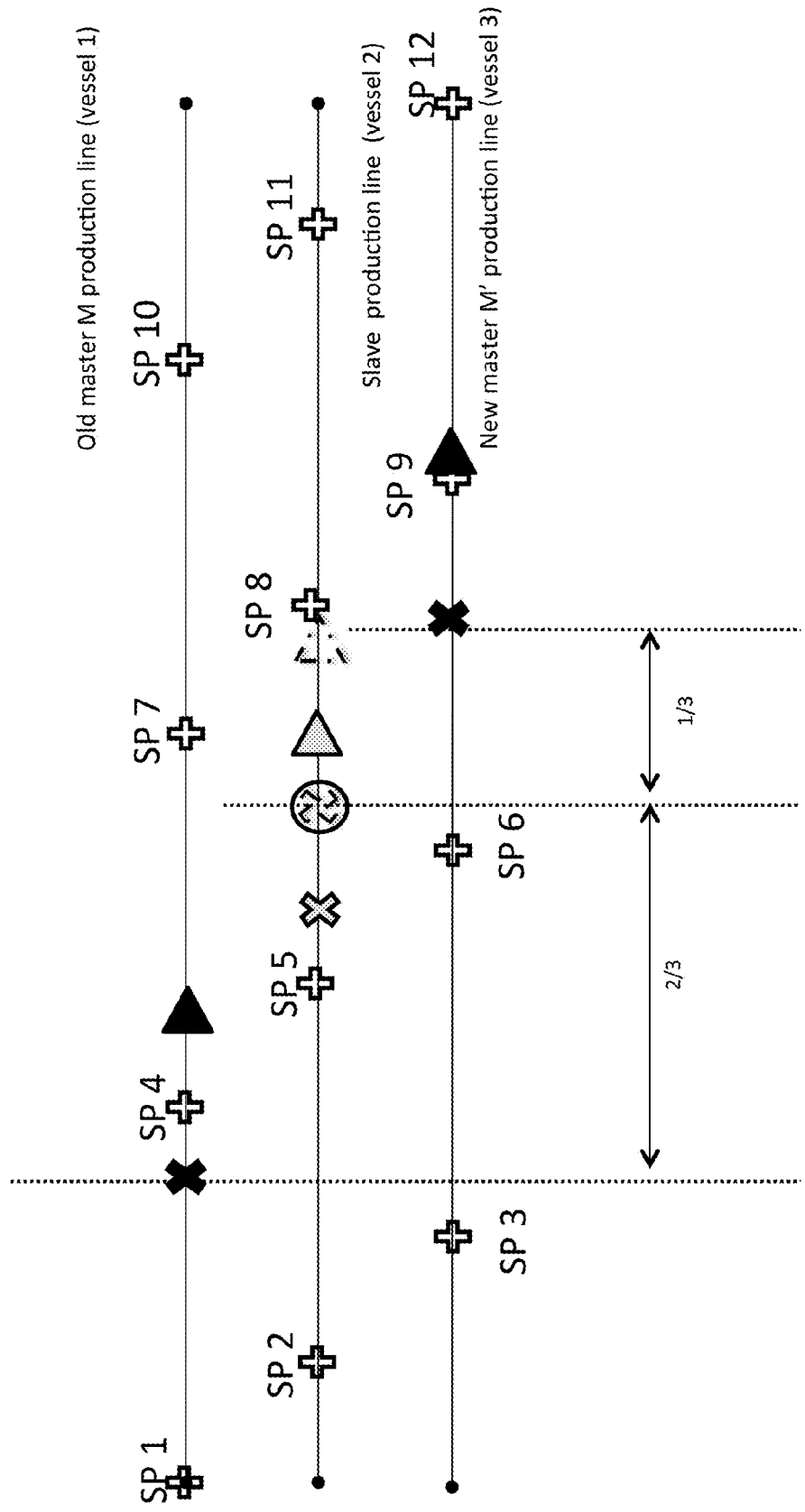

FIG. 7*c* represents the state at T=Transition-Duration*2/3, where the virtual master vessel is computed as a function of the old master vessel and the new master vessel. The "Bull's Eye" for the slave vessel corresponds to the projection of a pondered average of the old master vessel reference point and the new master vessel reference point.

Figure 7D:
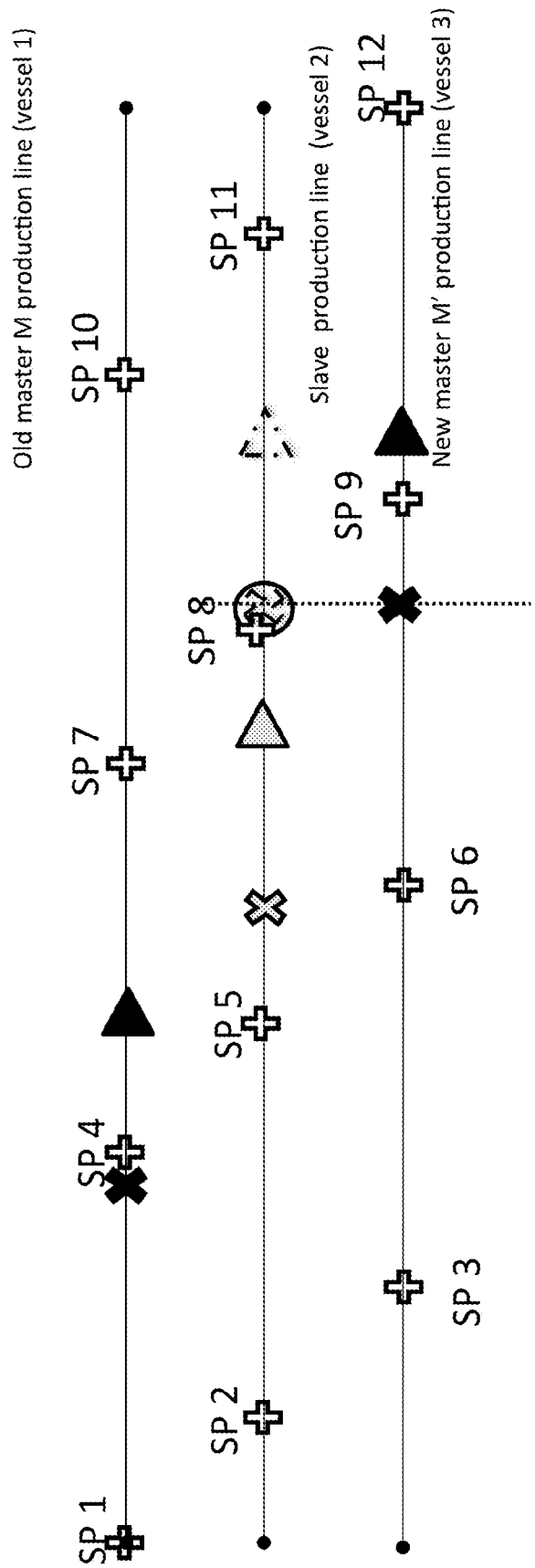

FIG. 7*d* represents the final state at T=Transition-Duration, where the virtual master vessel is computed as a function of the new master vessel only. The "Bull's Eye" for the slave vessel corresponds to the projection (represented by the vertical doted line) of the new master vessel reference point.

Referring now to FIGS. 8*a* to 8*d*, same example as illustrated in FIGS. 7*a* to 7*c* is presented, for computing time predictions.

In this example, the system comprises three vessels, including the old master vessel M (vessel 1), a slave vessel (vessel 2) and the new master vessel (vessel 3). On these FIGS. 8*a* to 8*d*, only the time line for old and new master vessels, as well as for the virtual master vessel are represented.

For each time line of old and new master vessels, the "time to reach shot point" are represented in black line, associated with the number of the shot point "SP i", and the interpolated "time to reach shot point" are represented in doted line, associated with the number of the shot point "SP j". For the virtual master time line, the "time to reach shot point" of the two other vessels (old and new master) are represented in black line.

According to this embodiment, the virtual master vessel time line is used as real time shooting predictions for all the vessels.

Figure 8A:
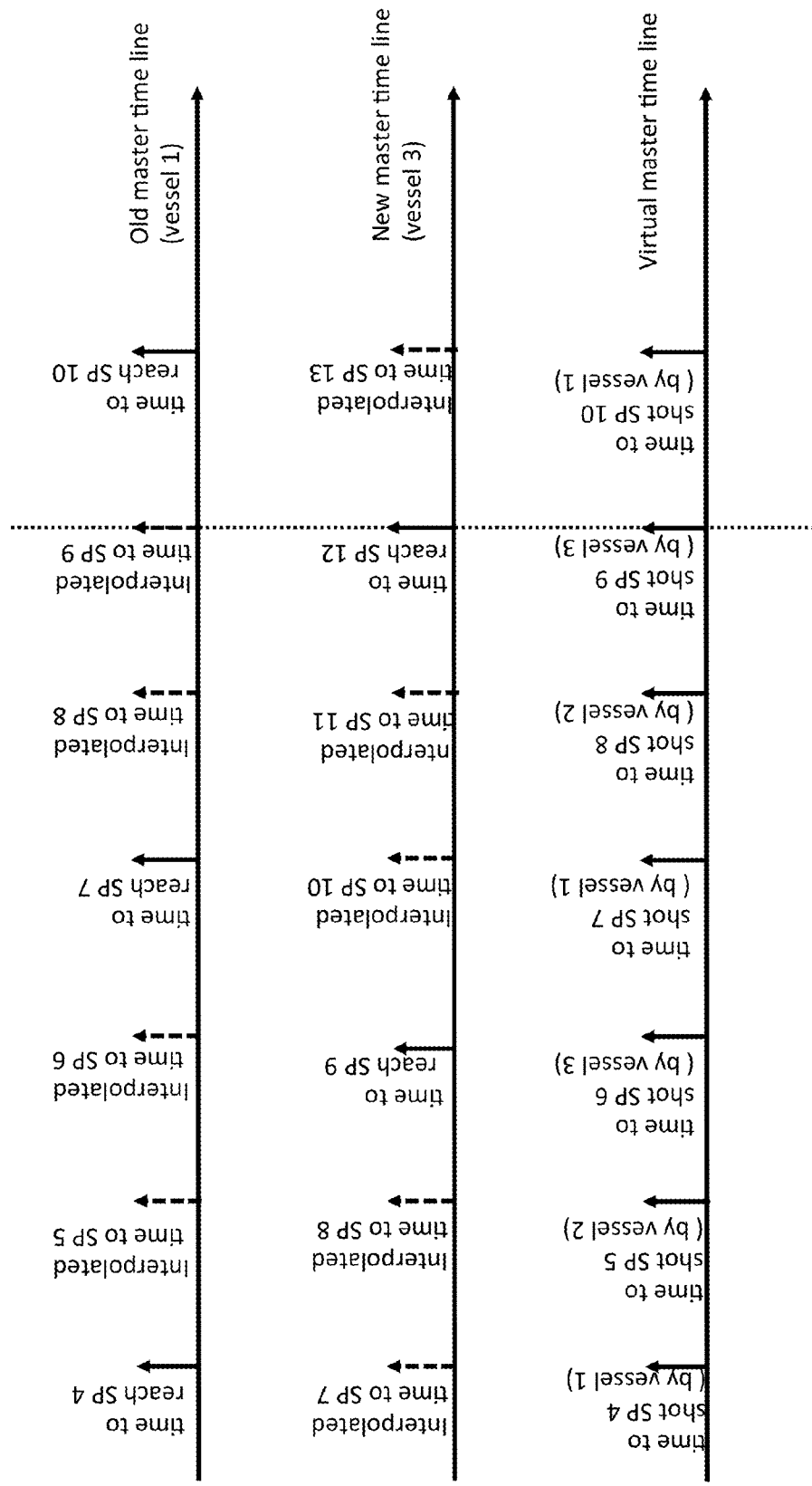
FIGS. 8a to 8d illustrate the first example of the second particular embodiment of a master vessel change management method, for computing time predictions.

FIG. 8*a* represents the initial state, at T=0, where the virtual master vessel is computed as a function of the old master vessel. Indeed, as can be seen, the "time to reach shot points" on the virtual master vessel time line match the "time to reach shot points" and interpolated "time to reach shot point" on the old master vessel time line. For example, the "time to reach SP9" is taken as a reference to illustrate this, thanks to the doted vertical line.

Figure 8B:
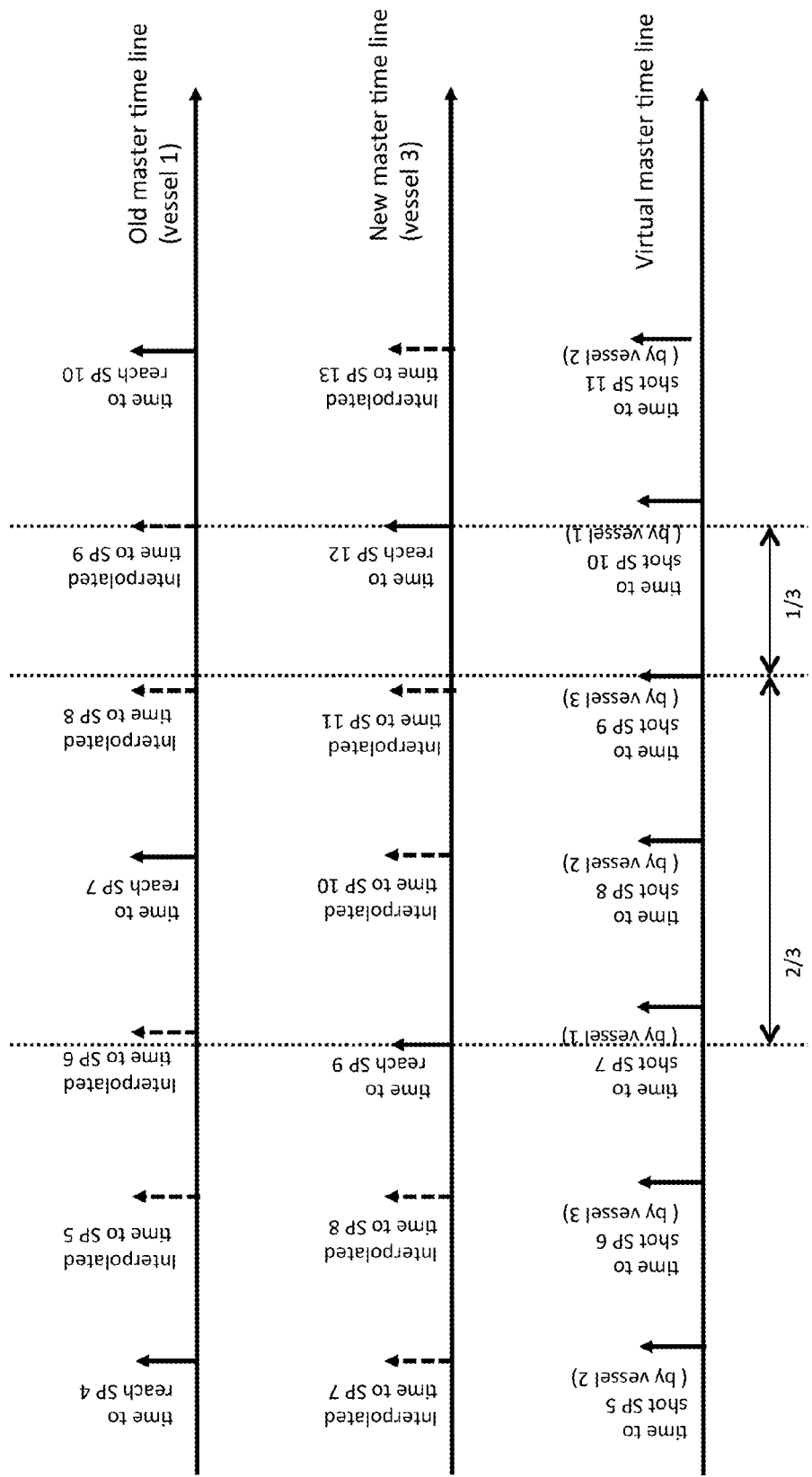

FIG. 8*b* represents the state at T=Transition-Duration/3, where the virtual master vessel is computed as a function, corresponding to a pondered average, of the old master vessel and the new master vessel. As can be seen, the "time to reach shot points" on the virtual master vessel time line don't match neither the "time to reach shot points" on the old master vessel time line nor the "time to reach shot points" on the new master vessel time line. For example, the "time to reach SP9", taken as a reference to illustrate this, is no more matching "time to reach SP9" on the old master vessel time line.

Figure 8C:
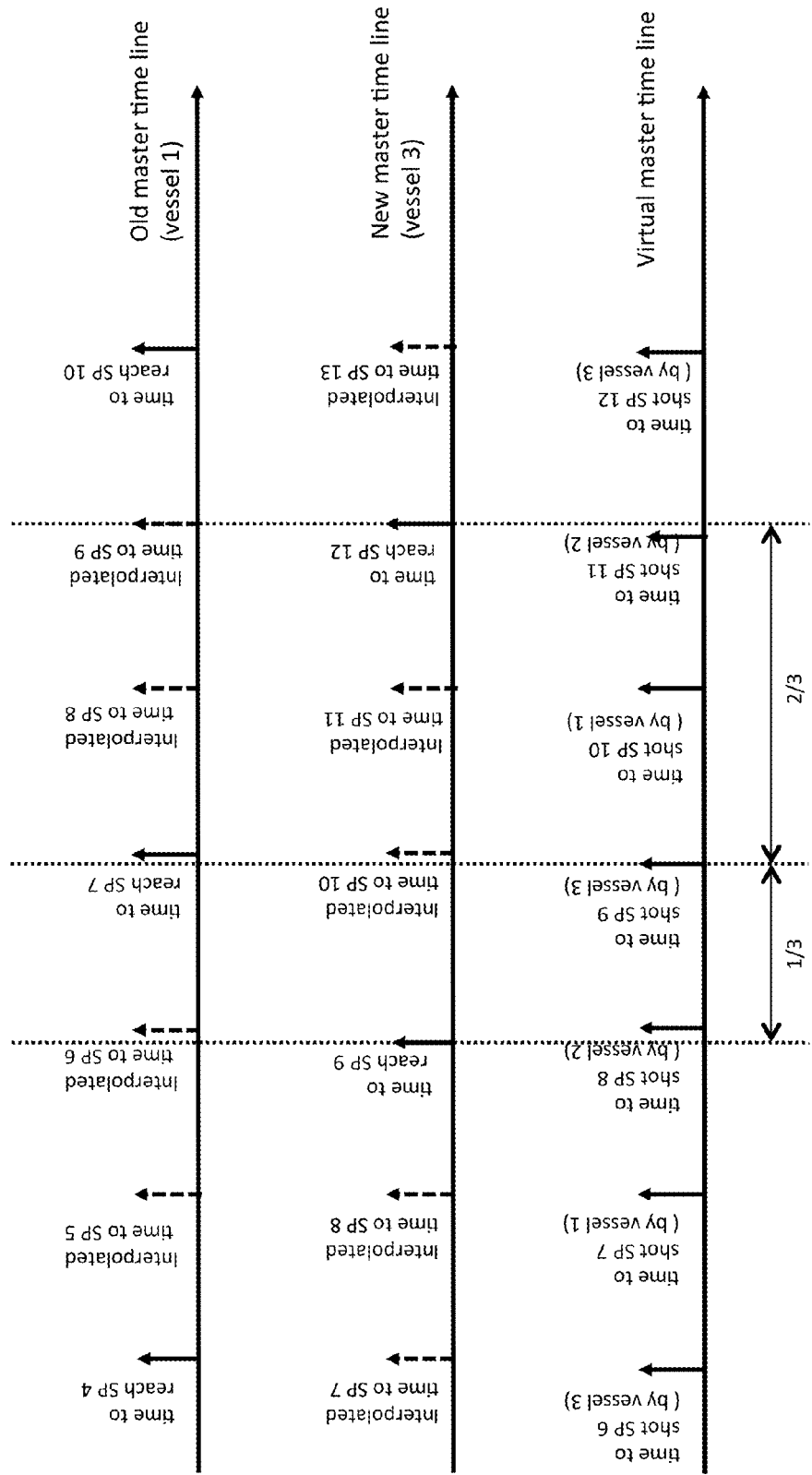

FIG. 8*c* represents the state at T=Transition-Duration*2/3, where the virtual master vessel is computed as a function, corresponding to a pondered average, of the old master vessel and the new master vessel. As can be seen, the "time to reach shot points" on the virtual master vessel time line don't match neither the "time to reach shot points" on the old master vessel time line nor the "time to reach shot points" on the new master vessel time line.

Figure 8D:
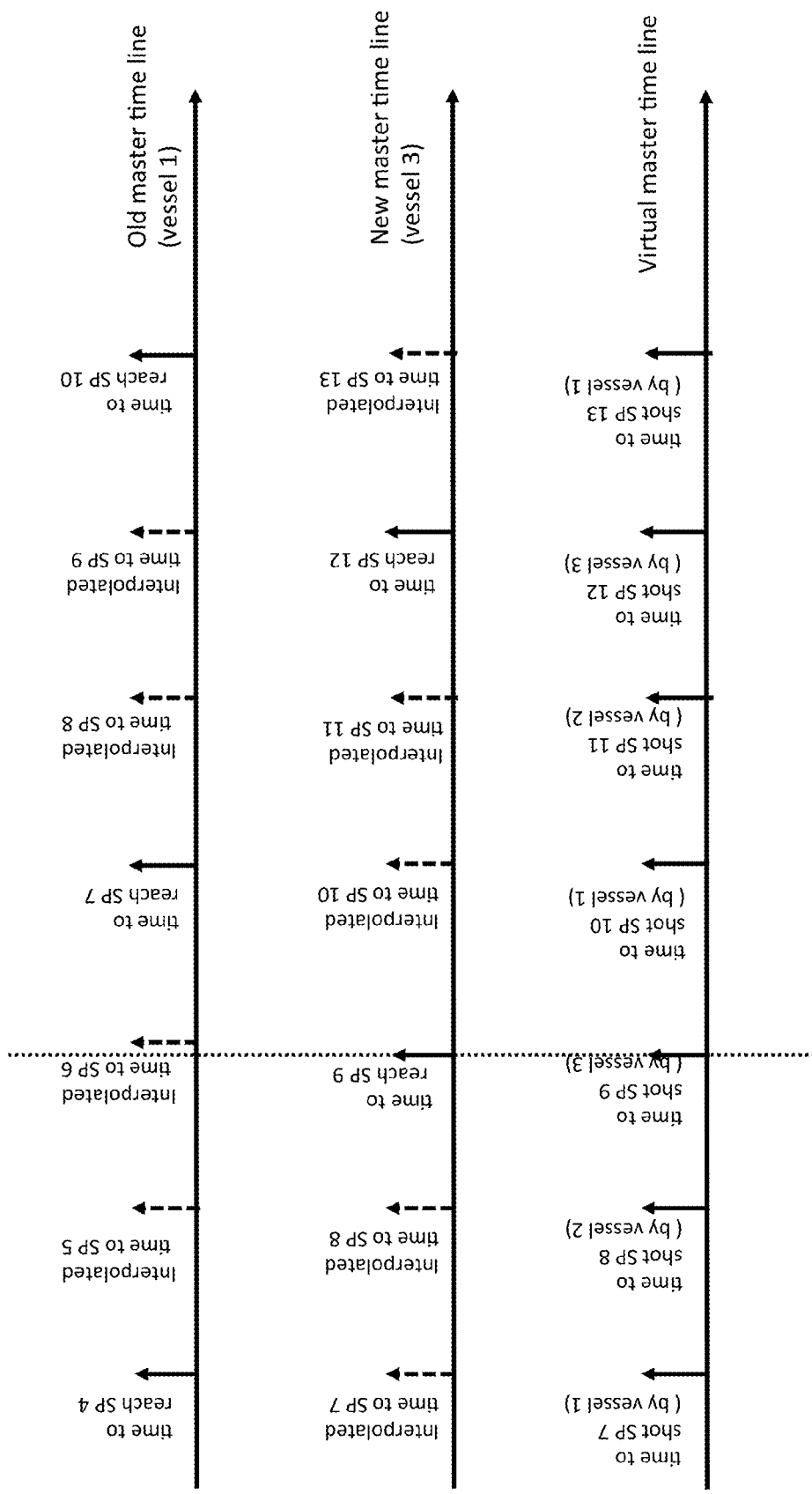

FIG. 8*d* represents the final state at T=Transition-Duration, where the virtual master vessel is computed as a function of the new master vessel only. Indeed, as can be seen, the "time to reach shot points" on the virtual master vessel time line match the "time to reach shot points" and the interpolated "time to reach shot point" on the new master vessel time line.

For example, the "time to reach SP9", taken as a reference to illustrate this, is now matching "time to reach SP9" on the new master vessel time line.

Figure 9:
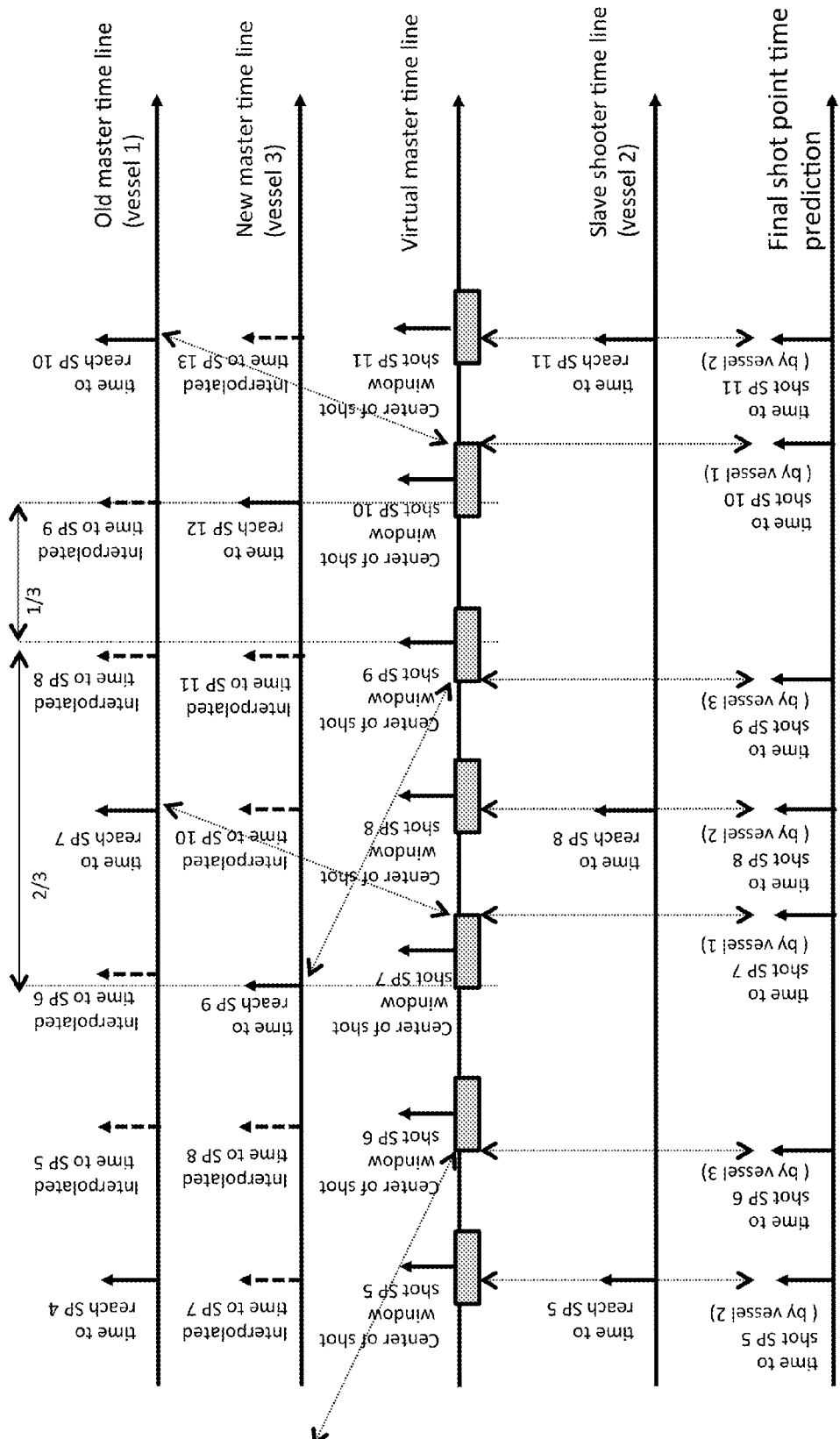
FIG. 9 illustrates a second example of the second particular embodiment of a master vessel change management method, with overlap avoidance process.

Referring now to FIG. 9, we present a second example of the second particular embodiment (progressive change) of a master vessel change management method, with overlap avoidance process.

FIG. 9 illustrates a system with three vessels (an old and a new master vessels and a slave shooter vessel) and corresponds to the example illustrated in FIG. 8*b* with a shot overlap avoidance process as described for example in the patent application document EP12306473.5 in the name of the same Applicant.

FIG. 9 illustrates especially the way virtual master series of time predictions is computed, for three vessels (vessel 1 old master vessel, vessel 2 slave shooter, vessel 3 new master vessel), and used as a shooting time windows for all vessels including old and new master vessel.

In the sample situation here, the slave shooter vessel (vessel 2) uses its "time to reach shot points" (SP 5, SP 8 and SP 11) as shooting prediction times as these "time to reach shot points" are inside windows.

For the vessel 3 (new master vessel), its "time to reach shot points" (SP 9 and SP 12) are in advance of the windows, so this vessel uses the most in advance border of the windows.

For the vessel 1 (old master vessel), its "time to reach shot points" (SP 4, SP 7 and SP 10) are late from windows, so this vessel uses the latest border of windows.

As the final shot time prediction of slave shooter vessel match the closest shot window border, or fit the time to reach point if these one is in the window, shooting error location (error along the line from real shot to planned shot location) is minimized, or null if inside the windows. Furthermore shot scheduling is ensured between vessels.

As in this particular embodiment shooting time windows are computed from virtual master prediction, this enables the optimization of shot point error location, even during progressive switch, for all slave vessels, and also old and new master vessel, while ensuring correct shot scheduling between vessels.

Figure 10:
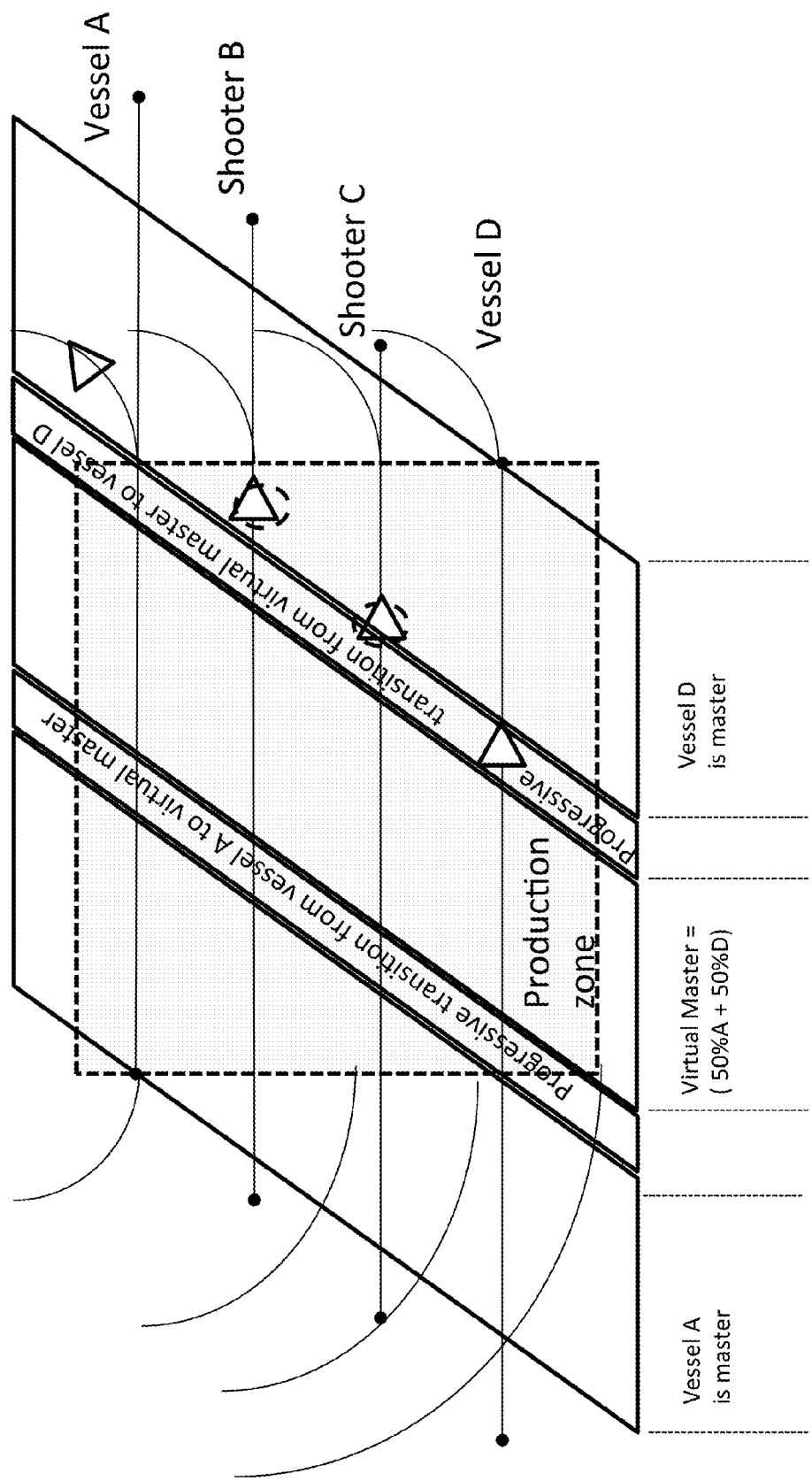
FIG. 10 illustrates a third example of the second particular embodiment of a master vessel change management method, allowing to share coverage error.

Referring now to FIG. 10, we present a third example of the second particular embodiment (progressive change) of a master vessel change management method, allowing to share coverage error between two streamer vessels.

In this example, the virtual master vessel can be computed continuously as a master vessel, from the average of vessels (½ from vessel A, ½ from vessel B) or (1/N vessel A1, 1/N vessel A2 . . . 1/N vessel A(N)), during all or a part of a survey.

This situation is typically useful with a two streamers vessels (or more) survey with one or more pure shooting vessels. In typical case, the vessels are usually not perfectly aligned. If slave shooting are aligned in position and shooting time only on a physical master vessel, the shot and coverage will be better for the master vessel than for the slave streamer vessel. Using a virtual master vessel which is basically the average of the two or more streamer vessels will allow sharing the error between streamer vessels.

FIG. 10 illustrates a system with two streamer vessels A and D and two shooter vessels B and C, and wherein vessel A is the master vessel at the beginning of the survey. Then, at a predefined time during the survey, a virtual master vessel is computed from 50% of the vessel A and 50% of the vessel D. A progressive change is performed to switch from a master vessel A to the virtual master vessel (50% A+50% D) and then a progressive change is performed to switch from a the virtual master vessel (50% A+50% D) to a master vessel D.

For example, the first progressive change begins when the vessel D enters in the production zone, and the second progressive change begins before the vessel A has leaved the production zone.

At least one embodiment of the disclosure provides a technique for managing a master vessel change in a multi-vessel seismic system comprising a master vessel M and at least one slave vessel, this technique ensuring not to stop the survey, even though the master vessel is not able to perform its operation.

At least one embodiment of the disclosure provides a technique of this kind, which avoids missed shots.

At least one embodiment of the disclosure provides a technique of this kind, which ensures regular shooting in time for all the vessels involved into the operation At least one embodiment of the disclosure provides a technique of this kind that is simple to implement and inexpensive.

The invention claimed is:

1. A method for managing a master vessel change in a multi-vessel seismic survey involving a plurality of vessels and comprising a master vessel M and at least one slave vessel moving along their respective paths, the master vessel being the reference to compute proper position of said at least one slave vessel, and at least one seismic source towed by at least one vessel, said method comprising:
    during at least a part of a multi-vessel survey:
    selecting a new master vessel M' among the at least one slave vessel, triggered by at least one predetermined event;
    transmitting, to said at least one slave vessel, at least one piece of information related to a master vessel change from the master vessel M, called old master vessel, to the new master vessel M'; and
    said method further comprising, for said at least one slave vessel,
    computing a new slave vessel target location as a function of a reference point of the new master vessel M' and,
    computing a new slave vessel shooting time prediction or a series of shooting time predictions as a function of the shooting time prediction or the series of shooting time predictions of the new master vessel M'.

2. The method according to claim 1, wherein said at least one piece of information is related to a progressive change in time of master vessel from old master vessel M to new master vessel M', and takes account of old master vessel M and new master vessel M'.

3. The method according to claim 1, wherein said at least one piece of information corresponds to:
    a target location as a function of a reference point of the new master vessel M' and,
    a new shooting time prediction or a series of shooting time predictions as a function of the shooting time prediction or the series of shooting time predictions of the new master vessel M'.

4. The method according to claim 1, wherein it comprises, for at least one slave vessel, at least an act of transmitting, to the other vessels of said multi-vessel seismic system, its reference point and its shooting time prediction, and for at least one slave vessel receiving said at least one piece of information:
    a) computing a new slave vessel target location, at least as a function of a reference point of the new master vessel M';
    b) computing a new slave vessel shooting time prediction or a new series of shooting time predictions, at least as a function of the shooting time prediction or the series of shooting time predictions of the new master vessel M', a reference point being used to calculate the ideal position for a vessel.

5. The method according to claim 4, wherein said at least one piece of information is related to a progressive change in time of master vessel from old master vessel M to new master vessel M', and takes account of old master vessel M and new master vessel M', and wherein:
    act a) comprises at least an iteration of a sub-act a') of computing at least one intermediate slave vessel target location, at least as a function of the reference point of the old master vessel M and of the reference point of new master vessel M';

act b) comprises at least an iteration of a sub-act b') of computing at least one intermediate slave vessel shooting time prediction or at least one intermediate slave vessel series of shooting time predictions, at least as a function of the shooting time prediction of the old master vessel M and of the shooting time prediction of the new master vessel M', or of the series of shooting time predictions of the old master vessel M and of the series of shooting time predictions of the new master vessel M'.

6. The method according to claim 5, wherein it comprises determining a virtual master vessel at least as a function of the old master vessel M and the new master vessel M' and, during the progressive change of master vessel and for at least one vessel of the multi-vessel seismic system, the sub-act b') takes account of the shooting time prediction or series of shooting time predictions of the virtual master vessel.

7. The method according to claim 6, wherein said determining a virtual master vessel comprises at least:
computing a virtual master vessel reference point, at least as a function of the old master vessel reference point and of the new master vessel reference point;
computing a virtual master vessel shooting time prediction or a virtual master vessel series of shooting time predictions, at least as a function of the time to reach a point for the old master vessel and the time to reach a point for the new master vessel.

8. The method according to claim 6, wherein said determining a virtual master vessel takes account of two or more listener vessels of the system.

9. The method according to claim 8, wherein each vessel of the system implements said determining a virtual master vessel.

10. The method according to claim 5, wherein the number of iterations of sub-acts a') and/or b') depends on at least one criterion pertaining to the group consisting of:
a predetermined distance to perform the progressive change;
the speed of at least one vessel of the system;
a minimum shot time interval for at least one vessel of the system;
the real shot time interval for at least one vessel of the system.

11. The method according to claim 1, wherein said predetermined event corresponds to a command emitted from any one of the vessels of the system and pertaining to the group consisting of:
a manual command issued by a user;
an automatic command depending on the position of the old master vessel compared to a way point;
an automatic command depending on a scheduled begin time for the master vessel change;
an automatic command triggered by a failure detection for a monitored parameter of the old master vessel.

12. The method according to claim 1, wherein said selecting a new master vessel M' among the at least two slave vessels comprises at least an iteration of the following sub-act:
selecting the vessel with the higher priority in a predetermined vessels priority list, checking, for said selected vessel, at least one predetermined parameters representative of the state of health of said selected vessel, verifying that at least one vessel is shooting:
in case of negative verification, the selected vessel becomes the new master vessel M',
in case of positive verification and if the selected vessel is not turning, the selected vessel becomes the new master vessel M',
in case of positive verification and if the selected vessel is turning, selecting a next vessel in predetermined vessels priority list.

13. The method according to claim 12, wherein said predetermined parameters pertain to the group consisting of:
the quality of radio link,
the DGPS position quality,
the reliability of sources positioning,
the deployment status of the source,
any other positioning or navigation failure on the system.

14. The method according to claim 5, wherein it comprises obtaining a snapshot of predetermined features, including positions, speeds, and time to reach points, of the old master vessel and in that said sub-acts a') and/or b') take account of an interpolation of said snapshot.

15. A non-transitory computer-readable carrier medium storing a computer program comprising program code instructions which, when executed on a computer or a processor, implement a method for managing a master vessel change in a multi-vessel seismic survey involving a plurality of vessels and comprising a master vessel M and at least one slave vessel moving along their respective paths, the master vessel being the reference to compute proper position of said at least one slave vessel, and at least one seismic source towed by at least one vessel, said method comprising, during at least a part of a multi-vessel survey:
selecting a new master vessel M' among the at least one slave vessel, triggered by at least one predetermined event;
transmitting, to said at least one slave vessel, at least one piece of information related to a master vessel change from the master vessel M, called old master vessel, to the new master vessel M'
said method further comprising, for said at least one slave vessel,
computing a new slave vessel target location as a function of reference point of the new master vessel M' and,
computing a new slave vessel shooting time prediction or a series of shooting time predictions as a function of the shooting time prediction or the series of shooting time predictions of the new master vessel M'.

16. A non-transitory computer-readable carrier medium storing a program which, when executed by a computer or a processor, causes the computer or the processor to carry out a method for managing a master vessel change in a multi-vessel seismic survey involving a plurality of vessels and comprising a master vessel M and at least one slave vessel moving along their respective paths, the master vessel being the reference to compute proper position of said at least one slave vessel, and at least one seismic source towed by at least one vessel, said method comprising, during at least a part of a multi-vessel survey:
selecting a new master vessel M' among the at least one slave vessel, triggered by at least one predetermined event;
transmitting, to said at least one slave vessel, at least one piece of information related to a master vessel change from the master vessel M, called old master vessel, to the new master vessel M'
said method further comprising, for said at least one slave vessel, computing a new slave vessel target location as a function of a reference point of the new master vessel M' and, computing a new slave vessel shooting time prediction or a series of shooting time predictions as a function of the shooting time prediction or the series of shooting time predictions of the new master vessel M'.

17. A multi-vessel seismic system comprising a master vessel M and at least two slave vessels, said system comprising the following means configured and adapted to manage a master vessel change, which are integrated in said at least one slave vessels of the system and activated during at least a part of a multi-vessel operation:

means configured and adapted to select a new master vessel M' among the at least two slave vessels, triggered by at least one predetermined event;

means configured and adapted to transmit at least one piece of information indicating that the master vessel is changing to become the new master vessel M' said system further comprising, for said at least one slave vessel, means configured and adapted to compute a new slave vessel target location a function of a reference point of the new master vessel M' and, means configured and adapted to compute a new slave vessel shooting time prediction or a series of shooting time predictions as a function of the shooting time prediction or the series of shooting time predictions of the new master vessel M'.

* * * * *